(12) United States Patent
Kusanose et al.

(10) Patent No.: US 10,703,848 B2
(45) Date of Patent: Jul. 7, 2020

(54) HYDROGENATED BLOCK COPOLYMER, POLYPROPYLENE RESIN COMPOSITION, AND MOLDING

(71) Applicant: Asahi Kasei Kabushiki Kaisha, Tokyo (JP)

(72) Inventors: Yasuhiro Kusanose, Tokyo (JP); Hiroyuki Ichino, Tokyo (JP); Masashi Yamamoto, Tokyo (JP); Masahiro Fujiwara, Tokyo (JP); Toshikazu Hoshina, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 127 days.

(21) Appl. No.: 15/758,373

(22) PCT Filed: Sep. 7, 2016

(86) PCT No.: PCT/JP2016/076306
§ 371 (c)(1),
(2) Date: Mar. 8, 2018

(87) PCT Pub. No.: WO2017/043532
PCT Pub. Date: Mar. 16, 2017

(65) Prior Publication Data
US 2018/0244822 A1 Aug. 30, 2018

(30) Foreign Application Priority Data

Sep. 9, 2015 (JP) ................................ 2015-177956
Sep. 9, 2015 (JP) ................................ 2015-177957
Sep. 9, 2015 (JP) ................................ 2015-177959
Sep. 9, 2015 (JP) ................................ 2015-177968

(51) Int. Cl.
| | |
|---|---|
| *C08F 297/04* | (2006.01) |
| *C08L 23/10* | (2006.01) |
| *C08F 8/04* | (2006.01) |
| *C09J 153/02* | (2006.01) |
| *C09J 7/20* | (2018.01) |
| *C08L 53/02* | (2006.01) |
| *C08L 23/14* | (2006.01) |
| *B32B 27/00* | (2006.01) |
| *C09J 11/06* | (2006.01) |

(52) U.S. Cl.
CPC ............ *C08F 297/04* (2013.01); *B32B 27/00* (2013.01); *C08F 8/04* (2013.01); *C08L 23/10* (2013.01); *C08L 23/14* (2013.01); *C08L 53/02* (2013.01); *C08L 53/025* (2013.01); *C09J 7/20* (2018.01); *C09J 11/06* (2013.01); *C09J 153/025* (2013.01); *C08F 2500/03* (2013.01); *C08F 2800/10* (2013.01); *C08L 2207/14* (2013.01)

(58) Field of Classification Search
CPC .................................................... C08L 53/025
See application file for complete search history.

(56) References Cited

U.S. PATENT DOCUMENTS

| | | | | |
|---|---|---|---|---|
| 5,206,301 | A | * 4/1993 | Hattori ...................... | C08F 8/04 525/285 |
| 2011/0319837 | A1 | 12/2011 | Uehara et al. | |
| 2012/0010351 | A1 | 1/2012 | Araki et al. | |
| 2015/0344684 | A1 | 12/2015 | Kusanose et al. | |
| 2016/0108228 | A1 | 4/2016 | Sasaki et al. | |

FOREIGN PATENT DOCUMENTS

| | | |
|---|---|---|
| EA | 201492243 A1 | 5/2015 |
| EP | 1702951 A1 | 9/2006 |
| EP | 3348591 A1 | 7/2018 |
| JP | H02-133406 A | 5/1990 |
| JP | H05-093125 A | 4/1993 |
| JP | H05-170844 A | 7/1993 |
| JP | H07-118335 A | 5/1995 |
| JP | H09-327893 A | 12/1997 |
| JP | H11-320765 A | 11/1999 |
| JP | 2000-093490 A | 4/2000 |
| JP | 2001-040173 A | 2/2001 |
| JP | 2001-240630 A | 9/2001 |
| JP | 2001-240636 A | 9/2001 |
| JP | 2003-205033 A | 7/2003 |
| JP | 2009-084461 A | 4/2009 |
| JP | 2012-236901 A | 12/2012 |
| JP | 2014-129479 A | 7/2014 |
| JP | 2016-196583 A | 11/2016 |
| WO | 2010/104068 A1 | 9/2010 |
| WO | 2010/104174 A1 | 9/2010 |
| WO | 2015/046524 A1 | 4/2015 |

OTHER PUBLICATIONS

International Search Report issued in corresponding International Patent Application No. PCT/JP2016/076306 dated Dec. 6, 2016.
International Preliminary Report on Patentability and Written Opinion issued in corresponding International Patent Application No. PCT/JP2016/076306 dated Mar. 22, 2018.
Supplementary European Search Report issued in corresponding European Patent Application No. 16844393.5 dated Aug. 17, 2018.

* cited by examiner

*Primary Examiner* — Mark S Kaucher
(74) *Attorney, Agent, or Firm* — Morgan, Lewis & Bockius LLP

(57) ABSTRACT

The present invention provides a hydrogenated block copolymer containing, in the molecule thereof, a polymer block (C) having a conjugated diene compound as a main component, a polymer block (B) having a conjugated diene compound as a main component, and a polymer block (S) having a vinyl aromatic compound as a main component.

14 Claims, No Drawings

US 10,703,848 B2

HYDROGENATED BLOCK COPOLYMER, POLYPROPYLENE RESIN COMPOSITION, AND MOLDING

TECHNICAL FIELD

The present invention relates to a hydrogenated block copolymer, a polypropylene resin composition comprising the same, and a molding thereof.

BACKGROUND ART

Polypropylene resin compositions are generally excellent in chemical resistance and mechanical properties and are therefore used in a wide range including packaging materials, machine parts, automobile parts, and the like. Because of environmental necessity, the development of non-halogenated transparent polymer materials has been underway recently. Particularly, in the fields of tubes, sheets, and films, polypropylene resins are used, and there has arisen a demand for, for example, softening the polypropylene resins or rendering the polypropylene resins transparent, according to applications.

Patent Literature 1 discloses a hydrogenated diene copolymer prepared by highly hydrogenating a block copolymer having pre-hydrogenated polymer blocks A, B, and C, wherein the block A has 80% by mass or more of a vinyl aromatic compound, the block B has 70% by mass or more of a conjugated diene compound wherein a vinyl bond content of the conjugated diene compound is higher than 70% by mass, and the block C is polybutadiene having a vinyl bond content of 30% by mass or less. The literature also describes that a molding prepared by blending such a block copolymer thus hydrogenated with a thermoplastic resin such as propylene and molding the blend is excellent in heat resistance, workability, transparency, rigidity, and molding appearance.

CITATION LIST

Patent Literature

Patent Literature 1: Japanese Patent Laid-Open No. 7-118335

SUMMARY OF INVENTION

Technical Problem

Moldings of polypropylene resin compositions for use in the packaging field for food, the packaging field for apparel, and the medical field including infusion tubes and infusion bags, etc. are required to have a good balance among properties such as transparency, flexibility, workability, low stickiness, and surface smoothness. However, the hydrogenated block copolymer as described in Patent Literature 1 has room for improvement in the balance among properties such as transparency, flexibility, workability, low stickiness, and surface smoothness when prepared into a polypropylene molding, for example, having a tube, sheet or film shape.

The present invention has been made in light of the problems of the conventional techniques described above. An object of the present invention is to provide a hydrogenated block copolymer excellent in low blocking, low hysteresis loss, and solvent resistance, the hydrogenated block copolymer being capable of imparting a good balance among transparency, flexibility, workability, low stickiness, and surface smoothness to a molding when applied to a polypropylene resin composition.

Solution to Problem

The present inventors have conducted diligent studies and experiments to solve the problems of the conventional techniques and consequently completed the present invention by finding that the problems can be solved by a hydrogenated block copolymer having a predetermined configuration.

The present invention is as follows:

[1]

A hydrogenated block copolymer comprising, in a molecule thereof, a polymer block (C) having a conjugated diene compound as a main component, a polymer block (B) having a conjugated diene compound as a main component, and a polymer block (S) having a vinyl aromatic compound as a main component, wherein:

in the hydrogenated block copolymer, a content of the polymer block (C) is 1 to 20% by mass, a content of the polymer block (B) is 69 to 98% by mass, and a content of the polymer block (S) is 1 to 15% by mass;

a vinyl bond content before hydrogenation of the polymer block (C) is 1 to 25 mol %, and a vinyl bond content before hydrogenation of the polymer block (B) is 60 to 100 mol %;

a degree of hydrogenation of the hydrogenated block copolymer is 80 mol % or more; and a tan δ peak obtained by a dynamic viscoelasticity measurement (1 Hz) of the hydrogenated block copolymer is in a range of higher than −45° C. and 10° C. or lower, a height of the tan δ peak is 1.0 or more, and a width at half height of the tan δ peak is 20° C. or lower.

[2]

The hydrogenated block copolymer according to [1], wherein the content of the polymer block (C) is 3 to 15% by mass, and a total content of the polymer block (C) and the polymer block (S) is 6 to 25% by mass.

[3]

The hydrogenated block copolymer according to [1] or [2], wherein the hydrogenated block copolymer comprises two or more polymer blocks (B), and a content of a polymer block (B-1) present at the end of the hydrogenated block copolymer based on the polymer blocks (B) is 1 to 10% by mass.

[4]

The hydrogenated block copolymer according to any of [1] to [3], wherein the polymer block (C) comprises butadiene, and the polymer block (B) comprises isoprene.

[5]

The hydrogenated block copolymer according to any of [1] to [4], wherein a value obtained from $V_H - V_L$ is 10 mol % or less, wherein, when the polymer block (B) is divided into a first region to a sixth region in order from a polymerization start side, each region having an equal mass, $V_H$ and $V_L$ represent a highest value and a lowest value, respectively, of vinyl bond contents before hydrogenation of the first region to the sixth region.

[6]

The hydrogenated block copolymer according to any of [1] to [5], wherein the content of the polymer block (S) is 3 to 10% by mass.

[7]

A hydrogenated block copolymer comprising, in a molecule thereof, a conjugated diene compound unit and a vinyl aromatic compound unit, wherein:

a content of the vinyl aromatic compound unit is 1 to 15% by mass;

a degree of hydrogenation of the hydrogenated block copolymer is 80 mol % or more;

a butylene content and/or a propylene content is 50 to 95 mol % based on 100 mol % in total of the conjugated diene compound unit;

the hydrogenated block copolymer has a crystallization peak at −20 to 80° C. and has a heat of crystallization of 0.1 to 10 J/g;

a Shore A hardness of the hydrogenated block copolymer is 15 to 65; and a tan δ peak obtained by a dynamic viscoelasticity measurement (1 Hz) of the hydrogenated block copolymer is in a range of higher than −45° C. and 10° C. or lower, a height of the tan δ peak is 1.0 or more, and a width at half height of the tan δ peak is 20° C. or lower.

[8]

The hydrogenated block copolymer according to any of [1] to [7], wherein the tan δ peak obtained by the dynamic viscoelasticity measurement (1 Hz) of the hydrogenated block copolymer is in the range of higher than −45° C. and 10° C. or lower, the height of the tan δ peak is 1.2 or more, and the width at half height of the tan δ peak is 18° C. or lower.

[9]

The hydrogenated block copolymer according to any of [1] to [8], wherein a total content of a component having a weight average molecular weight twice or more a peak weight average molecular weight and a component having a weight average molecular weight 0.5 times or less the peak weight average molecular weight is 15% or less.

[10]

The hydrogenated block copolymer according to any of [1] to [9], wherein a weight average molecular weight (Mw) of the hydrogenated block copolymer is 100,000 to 300,000, and a ratio of the weight average molecular weight (Mw) to a number average molecular weight (Mn), Mw/Mn, of the hydrogenated block copolymer is 1.01 to 1.30.

[11]

The hydrogenated block copolymer according to any of [1] to [10], wherein a g-factor is 0.11 to 0.25.

[12]

A polypropylene resin composition comprising 10 to 90% by mass of a hydrogenated block copolymer according to any of [1] to [11] and 10 to 90% by mass of a polypropylene resin, wherein in the wide angle X ray diffractometry of the polypropylene resin composition, an intensity ratio of diffraction peak intensity (I14) at a scattering angle (2θ) of 14° to diffraction peak intensity (I15) at a scattering angle (2θ) of 15°, I14/I15, is 0.1 or more and less than 1.4.

[13]

The polypropylene resin composition according to [12], wherein the polypropylene resin is a random polypropylene resin.

[14]

The polypropylene resin composition according to [12] or [13], wherein in measurement by cross fractionation chromatography, an integral elution volume at −20° C. or lower is 0.1% or more and less than 50% of a total volume, an integral elution volume in a range of higher than −20° C. and lower than 60° C. is 10% or more and less than 90% of the total volume, and an integral elution volume in a range of 60° C. or higher and 150° C. or lower is 10% or more and less than 90% of the total volume.

[15]

The polypropylene resin composition according to any one of [12] to [14], wherein in measurement by cross fractionation chromatography, a molecular weight distribution (Mw/Mn) of an eluted component in a range of 10° C. or higher and lower than 60° C. is 1.05 or more and 1.50 or less.

[16]

A tube comprising the polypropylene resin composition according to any one of [12] to [15].

[17]

A sheet-shaped molding comprising the polypropylene resin composition according to any one of [12] to [15].

[18]

A tacky film comprising:

a substrate film; and a tacky layer comprising the hydrogenated block copolymer according to any of [1] to [11], the tacky layer being disposed on the substrate film.

[19]

The tacky film according to [18], wherein the tacky layer further comprises 5 to 95% by mass of a hydrogenated block copolymer (b) and/or a hydrogenated block copolymer (c), and wherein the hydrogenated block copolymer (b) comprises, in a molecule thereof, a polymer block (B1) having a conjugated diene compound as a main component and a polymer block (S1) having a vinyl aromatic compound as a main component, wherein:

in the hydrogenated block copolymer (b), a content of the polymer block (B1) having the conjugated diene compound as the main component is 95 to 70% by mass, and a content of the polymer block (S1) having the vinyl aromatic compound as the main component is 5 to 30% by mass; and a vinyl bond content before hydrogenation of the polymer block (B1) having the conjugated diene compound as the main component is 30 to 100 mol %, and a degree of hydrogenation of the hydrogenated block copolymer (b) is 80 mol % or more, and wherein the hydrogenated block copolymer (c) comprises, in a molecule thereof, a polymer block (B2) comprising a conjugated diene compound and a vinyl aromatic compound and a polymer block (S2) having a vinyl aromatic compound as a main component, wherein:

in the hydrogenated block copolymer (c), a content of the polymer block (B2) comprising the conjugated diene compound and the vinyl aromatic compound is 95 to 70% by mass, and a content of the polymer block (S2) having the vinyl aromatic compound as the main component is 5 to 30% by mass; and a degree of hydrogenation of the hydrogenated block copolymer (c) is 80 mol % or more.

[20]

The tacky film according to [18] or [19], wherein the tacky layer further comprises 0.5 to 50% by mass of a tackifier.

[21]

The tacky film according to [20], wherein the tackifier comprises at least one member selected from the group consisting of a hydrogenated terpene resin, an aromatic modified hydrogenated terpene resin, a hydrogenated terpene phenol resin, and a terpene phenol resin.

[22]

A method for producing the hydrogenated block copolymer according to any of [1] to [11], comprising a polymerization step of polymerizing a vinyl aromatic compound and a conjugated diene compound in a presence of a vinylating agent, an organolithium compound, and an alkali metal alkoxide under conditions where a molar ratio of the vinylating agent to the organolithium compound (vinylating agent/organolithium compound) is 0.2 or more and less than 3.0, and a molar ratio of the alkali metal alkoxide to the organolithium compound (alkali metal alkoxide/organolithium compound) is 0.01 or more and 0.3 or less.

[23]

The method for producing a hydrogenated block copolymer according to [22], wherein in the polymerization step, difference in polymerization temperature in forming the polymer block (B) is within 20° C., and wherein a value obtained from $V_H$-$V_L$ is 10 mol % or less, wherein, when the polymer block (B) is divided into a first region to a sixth region in order from a polymerization start side, each region having an equal mass, $V_H$ and $V_L$ represent a highest value and a lowest value, respectively, of vinyl bond contents before hydrogenation of the first region to the sixth region.

Advantageous Effects of Invention

The hydrogenated block copolymer according to the present invention is excellent in low blocking, low hysteresis loss, and solvent resistance and is capable of imparting a good balance among transparency, flexibility, workability, low stickiness, and surface smoothness to a molding when applied to a polypropylene resin composition.

DESCRIPTION OF EMBODIMENTS

Hereinafter, an embodiment for carrying out the present invention (hereinafter, simply referred to as the "present embodiment") will be described in detail. The present embodiment is given for illustrating the present invention and is not intended to limit the present invention to the contents described below. The present invention can be carried out by making various changes or modifications without departing from the scope of the present invention.

<Hydrogenated Block Copolymer>

The hydrogenated block copolymer of the present embodiment is a hydrogenated block copolymer comprising, in the molecule thereof, a polymer block (C) having a conjugated diene compound as a main component, a polymer block (B) having a conjugated diene compound as a main component, and a polymer block (S) having a vinyl aromatic compound as a main component, wherein: in the hydrogenated block copolymer, a content of the polymer block (C) is 1 to 20% by mass, a content of the polymer block (B) is 69 to 98% by mass, and a content of the polymer block (S) is 1 to 15% by mass; a vinyl bond content before hydrogenation of the polymer block (C) is 1 to 25 mol %, and a vinyl bond content before hydrogenation of the polymer block (B) is 60 to 100 mol %; a degree of hydrogenation of the hydrogenated block copolymer is 80 mol % or more; and a tan δ peak obtained by the dynamic viscoelasticity measurement (1 Hz) of the hydrogenated block copolymer is in the range of higher than −45° C. and 10° C. or lower, a height of the tan δ peak is 1.0 or more, and a width at half height of the tan δ peak is 20° C. or lower.

Also, the hydrogenated block copolymer of the present embodiment mentioned above can be specified as follows: the hydrogenated block copolymer of the present embodiment is a hydrogenated block copolymer comprising, in the molecule thereof, a conjugated diene compound unit and a vinyl aromatic compound unit, wherein: a content of the vinyl aromatic compound unit is 1 to 15% by mass; a degree of hydrogenation of the hydrogenated block copolymer is 80 mol % or more; a butylene content and/or a propylene content is 50 to 95 mol % based on 100 mol % in total of the conjugated diene compound unit; the hydrogenated block copolymer has a crystallization peak at −20 to 80° C. and has a heat of crystallization of 0.1 to 10 J/g; a Shore A hardness of the hydrogenated block copolymer is 15 to 65; and a tan δ peak obtained by the dynamic viscoelasticity measurement (1 Hz) of the hydrogenated block copolymer is in the range of higher than −45° C. and 10° C. or lower, a height of the tan δ peak is 1.0 or more, and a width at half height of the tan δ peak is 20° C. or lower.

The hydrogenated block copolymer according to the present embodiment configured as described above is excellent in low blocking, low hysteresis loss, and solvent resistance and is capable of imparting a good balance among transparency, flexibility, workability, low stickiness, and surface smoothness to a molding when applied to a polypropylene resin composition.

(Hydrogenated Block Copolymer)

The hydrogenated block copolymer according to the present embodiment (hereinafter, also simply referred to as a "hydrogenated block copolymer (a)") comprises, in the molecule thereof, a polymer block (C) having a conjugated diene compound as a main component (hereinafter, also simply referred to as a "polymer block (C)"), a polymer block (B) having a conjugated diene compound as a main component (hereinafter, also simply referred to as a "polymer block (B)"), and a polymer block (S) having a vinyl aromatic compound as a main component (hereinafter, also simply referred to as a "polymer block (S)"). The polymer blocks (C) and (B) each have a specific vinyl bond content before hydrogenation, as mentioned later.

In the present embodiment, the phrase "having . . . as a main component" means containing 60% by mass or more of the monomer unit in the polymer block. The contents of the conjugated diene compounds in the polymer block (C) and the polymer block (B) each having a conjugated diene compound as a main component are each independently preferably 70% by mass or more, more preferably 80% by mass or more, further preferably 90% by mass or more, from the viewpoint of the low hysteresis loss and solvent resistance of the hydrogenated block copolymer and from the viewpoint of the transparency, flexibility, and surface smoothness of a molding of the resulting polypropylene resin composition.

The content of the vinyl aromatic compound in the polymer block (S) having a vinyl aromatic compound as a main component is preferably 70% by mass or more, more preferably 80% by mass or more, further preferably 90% by mass or more, from the viewpoint of the low hysteresis loss of the hydrogenated block copolymer and from the viewpoint of high dispersibility in a polypropylene resin.

The content of the conjugated diene compound and the content of the vinyl aromatic compound can be measured by nuclear magnetic resonance spectrometry (NMR).

The conjugated diene compound unit is a unit forming the hydrogenated block copolymer (a) and refers to a unit derived from a monomer of a conjugated diene compound. Also, the vinyl aromatic compound unit is a unit forming the hydrogenated block copolymer (a) and refers to a unit derived from a monomer of a vinyl aromatic compound.

The "vinyl bond content before hydrogenation" in the polymer blocks (C) and (B) means the percentage (mol %)

of pre-hydrogenated conjugated dienes attached by 1,2 bonds and 3,4-bonds relative to those attached by 1,2-bonds, 3,4-bonds, and 1,4-bonds.

The vinyl bond content can be measured by nuclear magnetic resonance spectrometry (NMR).

In the present embodiment, the conjugated diene for use in the polymer block (C) or (B) in the hydrogenated block copolymer (a) is a diolefin having a pair of conjugated double bonds. Examples of the diolefin include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene. Particularly, general examples of the diolefin include 1,3-butadiene and isoprene. These conjugated dienes may be used alone or in combination of two or more.

In the present embodiment, preferably, the polymer block (C) comprises of butadiene, and the polymer block (B) comprises isoprene, from the viewpoint of high dispersibility in a polypropylene resin.

In the present embodiment, examples of the vinyl aromatic compound for use in the polymer block (S) in the hydrogenated block copolymer (a) include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. Among them, styrene, α-methylstyrene, or 4-methylstyrene is preferably used from the viewpoint of availability and productivity. Styrene is particularly preferred. The polymer block (S) may be constituted by one vinyl aromatic compound unit or may be constituted by two or more vinyl aromatic compound units.

The content of the polymer block (C) in the hydrogenated block copolymer (a) is 1 to 20% by mass from the viewpoint of the low blocking, low hysteresis loss, and solvent resistance of the hydrogenated block copolymer and from the viewpoint of the transparency, flexibility, workability, low stickiness, and surface smoothness of a molding of the resulting polypropylene resin composition. From similar viewpoints, the content of the polymer block (C) in the hydrogenated block copolymer (a) is preferably 3 to 17% by mass, more preferably 3 to 15% by mass, further preferably 5 to 15% by mass. The content of the polymer block (C) can be measured by a method described in Examples mentioned later.

The vinyl bond content before hydrogenation of the polymer block (C) is 1 to 25 mol % from the viewpoint of the low blocking, low hysteresis loss, and solvent resistance of the hydrogenated block copolymer and from the viewpoint of the workability, low stickiness, and surface smoothness of a molding of the resulting polypropylene resin composition. From similar viewpoints, the vinyl bond content before hydrogenation of the polymer block (C) is preferably 3 to 22 mol %, more preferably 5 to 20 mol %.

The vinyl bond content before hydrogenation of the polymer block (C) having a conjugated diene compound as a main component can be specifically measured by a method described in Examples mentioned later.

The vinyl bond content can be controlled by use of a vinylating agent such as a polar compound or a Lewis base (e.g., ether or amine).

The content of the polymer block (B) in the hydrogenated block copolymer (a) is 69 to 98% by mass from the viewpoint of the low blocking and low hysteresis loss of the hydrogenated block copolymer and from the viewpoint of the transparency, flexibility, and low stickiness of a molding of the resulting polypropylene resin composition. From similar viewpoints, the content of the polymer block (B) is preferably 75 to 95% by mass, more preferably 80 to 90% by mass. The content of the polymer block (B) can be measured by a method described in Examples mentioned later.

The vinyl bond content before hydrogenation of the polymer block (B) is 60 to 100 mol % from the viewpoint of the low blocking and low hysteresis loss of the hydrogenated block copolymer and from the viewpoint of the transparency, flexibility, and low stickiness of a molding of the resulting polypropylene resin composition. From similar viewpoints, the vinyl bond content before hydrogenation of the polymer block (B) is preferably 68 to 95 mol %, more preferably 73 to 90 mol %.

The vinyl bond content before hydrogenation of the polymer block (B) having a conjugated diene compound as a main component can be specifically measured by a method described in Examples mentioned later.

The vinyl bond content can be controlled by use of a vinylating agent such as a polar compound or a Lewis base (e.g., ether or amine).

The content of the polymer block (S) in the hydrogenated block copolymer (a) is 1 to 15% by mass from the viewpoint of the low blocking and low hysteresis loss of the hydrogenated block copolymer and from the viewpoint of the transparency, flexibility, workability, and low stickiness of a molding of the resulting polypropylene resin composition. From similar viewpoints, the content of the polymer block (S) is preferably 2 to 12% by mass, more preferably 3 to 10% by mass, further preferably 3 to 8% by mass. From similar viewpoints, the content of the vinyl aromatic compound unit in the hydrogenated block copolymer (a) is 1 to 15% by mass and is preferably 2 to 12% by mass, more preferably 3 to 10% by mass, further preferably 3 to 8% by mass. The content of the polymer block (S) and the content of the vinyl aromatic compound unit in the hydrogenated block copolymer can each be measured by a method described in Examples mentioned later.

The butylene content and/or propylene content of the hydrogenated block copolymer (a) is 50 to 95 mol % and is preferably 57 to 87 mol %, more preferably 65 to 80 mol %, based on 100 mol % in total of the conjugated diene compound unit from the viewpoint of the low hysteresis loss of the hydrogenated block copolymer and from the viewpoint of high dispersibility in a polypropylene resin. The butylene content and/or propylene content can be measured by a method described in Examples mentioned later. The butylene content and/or propylene content can be controlled by use of a vinylating agent such as a polar compound or a Lewis base (e.g., ether or amine) or by the degree of hydrogenation.

In the present embodiment, the total content of the polymer block (C) and the polymer block (S) in the hydrogenated block copolymer (a) is preferably 2 to 31% by mass, more preferably 6 to 25% by mass, further preferably 8 to 20% by mass, from the viewpoint of the hardness balance of the hydrogenated block copolymer and from the viewpoint of the flexibility of a molding of the resulting polypropylene resin composition.

Examples of the structure of the hydrogenated block copolymer (a) of the present embodiment include, but are not particularly limited to, structures represented by the following formulas:

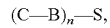

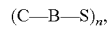

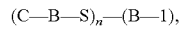

(C—B—S—(B—1))$_n$, (C—B—S)$_m$—X, and (C—B—S—(B-1))$_m$-X, wherein C, B, S, and B-1 represent polymer blocks (C), (B), (S), and (B-1) mentioned later, respectively, and when there are a plurality of polymer blocks (C), (B), (S), or (B-1), these polymer blocks may be different from or the same as each other; n represents an integer of 1 or larger, preferably 1 to 3; m represents an integer of 2 or larger, preferably 2 to 6; and X represents a residue of a coupling agent or a residue of a polyfunctional initiator.

A polymer represented by the structural formula C—B—S or C—B—S—(B-1) is particularly preferred.

Preferably, the hydrogenated block copolymer (a) comprises two or more polymer blocks (B) in the molecule thereof, wherein the content of a polymer block (B-1) present at the end of the hydrogenated block copolymer (a) based on the polymer blocks (B) is 1 to 10% by mass in the hydrogenated block copolymer (a), from the viewpoint of the workability of the hydrogenated block copolymer and the resulting polypropylene resin composition. From similar viewpoints, the content of the polymer block (B-1) is more preferably 1.5 to 7% by mass, further preferably 2 to 5% by mass, in the hydrogenated block copolymer (a).

The content of the polymer block (B-1) present at the end of the hydrogenated block copolymer (a) can be controlled by the feed composition of polymerization monomers.

When the polymer block (B) according to the present embodiment is divided into a first region to a sixth region in order from a polymerization start side, each region having an equal mass, and $V_H$ and $V_L$ represent the highest value and the lowest value, respectively, of vinyl bond contents before hydrogenation of the first region to the sixth region, a value obtained from $V_H$–$V_L$ (hereinafter, also referred to as ΔV) is preferably 10 mol % or less. When ΔV is 10 mol % or less, there is a tendency that: the resulting hydrogenated block copolymer has a high value of a tan δ peak and a narrow width at half height of the tan δ peak; the resulting polypropylene resin composition has stable dispersibility; and a molding of the resulting polypropylene resin composition is excellent in balance among physical properties. From similar viewpoints, ΔV is more preferably 8 mol % or less, further preferably 6 mol % or less.

The vinyl bond contents ($V_H$ and $V_L$) before hydrogenation of the polymer block (B) having a conjugated diene compound as a main component can be specifically measured by a method described in Examples mentioned later.

The ΔV can be controlled to within the preferred range mentioned above, for example, by decreasing the difference in polymerization temperature in forming the polymer block (B).

The degree of hydrogenation of the hydrogenated block copolymer (a), i.e., the degree of hydrogenation of all the conjugated diene compound units contained in the hydrogenated block copolymer (a), is 80 mol % or more and is preferably 85 mol % or more, more preferably 90 mol % or more, further preferably 95 mol % or more.

The degree of hydrogenation of all unsaturated groups contained in the conjugated diene monomer units of the hydrogenated block copolymer (a) can be measured by a method described in Examples mentioned later.

The degree of hydrogenation is set to 80 mol % or more to thereby enhance the crystallization of the polymer block (C) and to thereby improve the low blocking, low hysteresis loss, and solvent resistance of the hydrogenated block copolymer, and the workability, low stickiness, and surface smoothness of a molding of the resulting polypropylene resin composition. In addition, the polymer block (B) and a polypropylene resin have closer solubility parameters so that the hydrogenated block copolymer (a) has good dispersibility. Therefore, a molding of the resulting polypropylene resin composition has good flexibility and transparency.

The degree of hydrogenation can be controlled by, for example, the amount of a hydrogenation catalyst. The hydrogenation rate can be controlled by, for example, the amount of a hydrogenation catalyst, the amount of hydrogen fed, pressure, or temperature.

In the present embodiment, a tan δ peak obtained by subjecting the hydrogenated block copolymer (a) to dynamic viscoelasticity measurement (1 Hz) is in the range of higher than −45° C. and 10° C. or lower, the height of the tan δ peak is 1.0 or more, and the width at half height of the tan δ peak is 20° C. or lower. The tan δ peak is preferably in the range of −40 to 0° C., more preferably in the range of −35 to −5° C., from the viewpoint of the low hysteresis loss of the hydrogenated block copolymer and from the viewpoint of the transparency and flexibility of a molding of the resulting polypropylene resin composition. The height of the tan δ peak is preferably 1.2 or more, more preferably 1.5 or more, from the viewpoint of the low hysteresis loss of the hydrogenated block copolymer and from the viewpoint of the flexibility and low stickiness of a molding of the resulting polypropylene resin composition. The width at half height of the tan δ peak is preferably 18° C. or lower, more preferably 16° C. or lower, from the viewpoint of the low hysteresis loss of the hydrogenated block copolymer and from the viewpoint of the workability, low stickiness, and surface smoothness of a molding of the resulting polypropylene resin composition.

From the viewpoints mentioned above, particularly preferably, the tan δ peak is in the range of higher than −45° C. and 10° C. or lower, the height of the tan δ peak is 1.2 or more, and the width at half height of the tan δ peak is 18° C. or lower.

The tan δ peak is controlled by the amount of a vinylating agent such as a polar compound or a Lewis base (e.g., ether or amine) used, and tends to satisfy the range mentioned above in the case of producing the hydrogenated block copolymer according to a preferred production method mentioned later. For example, as the amount of the vinylating agent used in polymerization for the polymer block (B) shown in Example 1 mentioned later is decreased, the tan δ peak temperature tends to be lowered. The tan δ peak temperature can also be controlled by the degree of hydrogenation. As the degree of hydrogenation is decreased, the tan δ peak temperature tends to be lowered.

As for the control of the height of the tan δ peak and the width at half height of the tan δ peak, these values tend to satisfy the ranges mentioned above in the case of producing the hydrogenated block copolymer according to a preferred production method mentioned later. For example, as the amount of the vinylating agent used in polymerization for the polymer block (B) is increased, the tan δ peak height tends to be increased and the width at half height of the tan δ peak tends to be narrowed. On the other hand, the molecular weight distribution tends to be widened. Accordingly, in addition to the control described above, the content of the polymer block (B) and the polymerization temperature can be appropriately adjusted to thereby control the values to within the ranges described above. As the content of the polymer block (B) is increased, the tan δ peak height tends to be increased and the width at half height of the tan δ peak tends to be narrowed. As the polymerization temperature of polymerization for the polymer block (B) is closer to isothermal conditions (conditions having smaller difference in temperature), the tan δ peak height tends to be increased and the width at half height of the tan δ peak tends to be narrowed.

The hydrogenated block copolymer (a) has a crystallization peak at −20 to 80° C. and has a heat of crystallization of 0.1 to 10 J/g from the viewpoint of the low blocking, low hysteresis loss, and solvent resistance of the hydrogenated block copolymer and from the viewpoint of the transparency, flexibility, workability, low stickiness, and surface smoothness of a molding of the resulting polypropylene resin composition. From similar viewpoints, the temperature range involving the crystallization peak is preferably −10 to 70° C., more preferably 0 to 60° C. The heat of crystallization is preferably 1.0 to 7.5 J/g, more preferably 2.0 to 5.0 J/g.

The temperature range involving the crystallization peak and the heat of crystallization can be measured by a method described in Examples mentioned later.

The crystallization peak temperature range and the heat of crystallization of the hydrogenated block copolymer (a) can be controlled by the content of the polymer block (C), by use of a vinylating agent such as a polar compound or a Lewis base (e.g., ether or amine), or by the degree of hydrogenation. The crystallization peak temperature range and the heat of crystallization tend to satisfy the ranges mentioned above in the case of producing the hydrogenated block copolymer according to a preferred production method mentioned later. For example, as the content of the polymer block (C) is increased, the crystallization peak temperature range and the heat of crystallization tend to be higher. As the amount of the vinylating agent used in polymerization for the polymer block (C) is increased, the crystallization peak temperature range and the heat of crystallization tend to be lower. As the degree of hydrogenation is decreased, the crystallization peak temperature range and the heat of crystallization tend to be lower.

The Shore A hardness of the hydrogenated block copolymer (a) is 15 to 65 and is preferably 25 to 55, more preferably 30 to 50, from the viewpoint of the low hysteresis loss of the hydrogenated block copolymer and from the viewpoint of the flexibility and surface smoothness of a molding of the resulting polypropylene resin composition. The Shore A hardness can be measured by a method described in Examples mentioned later. The Shore A hardness of the hydrogenated block copolymer (a) can be controlled by, for example, the content of the polymer block (C), (B), or (S) having a conjugated diene compound as a main component, the degree of hydrogenation, or a vinylating agent such as a polar compound or a Lewis base (e.g., ether or amine) used in polymerization. As the total content of the polymer block (C) and the polymer block (S) is increased, the Shore A hardness tends to be increased. As the amount of the vinylating agent is increased, the Shore A hardness tends to be decreased. As the degree of hydrogenation is decreased, the Shore A hardness tends to be decreased.

The melt flow rate (MFR; conforming to ISO 1133) of the hydrogenated block copolymer (a) is preferably in the range of 0.5 to 10 g/10 minutes, more preferably 1.0 to 8 g/10 minutes, further preferably 1.5 to 6 g/10 minutes, still further preferably 2.0 to 5.0 g/10, from the viewpoint of the low blocking of the hydrogenated block copolymer and from the viewpoint of the workability, low stickiness, and surface smoothness of a molding of the resulting polypropylene resin composition.

The dispersity of the hydrogenated block copolymer (a) is preferably 0.20 to 0.50, more preferably 0.25 to 0.40, further preferably 0.28 to 0.35, from the viewpoint of the low hysteresis loss of the hydrogenated block copolymer. The dispersity can be determined by a method described in Examples mentioned later and can be controlled to within the range described above by the content of the polymer block (C), (B), or (S), the degree of hydrogenation, or the polymerization temperature.

The weight average molecular weight (Mw) (hereinafter, also referred to as "Mw") of the hydrogenated block copolymer (a) is preferably 100,000 to 300,000, more preferably 130,000 to 280,000, further preferably 150,000 to 260,000, from the viewpoint of the low blocking, low hysteresis loss, and solvent resistance of the hydrogenated block copolymer and from the viewpoint of the workability of a molding of the resulting polypropylene resin composition.

The weight average molecular weight (Mw) of the hydrogenated block copolymer (a) is a weight average molecular weight (Mw) determined as the molecular weight of the chromatogram peak in GPC measurement on the basis of a calibration curve obtained from the measurement of commercially available standard polystyrene (created by using the peak molecular weight of standard polystyrene). The molecular weight distribution of the hydrogenated block copolymer and the total content of a high molecular weight component and a low molecular weight component can also be determined from similar measurement by GPC. The molecular weight distribution is calculated as the ratio of the weight average molecular weight (Mw) to a number average molecular weight (Mn). The total content of a high molecular weight component and a low molecular weight component mentioned later is determined as a value obtained by dividing the total peak area of the high molecular weight component and the low molecular weight component by the total area of peaks.

The ratio of the weight average molecular weight (Mw) to the number average molecular weight (Mn), Mw/Mn, of the hydrogenated block copolymer (a) is preferably 1.01 to 1.30, more preferably 1.02 to 1.25, further preferably 1.03 to 1.20, from the viewpoint of uniform dispersibility in a polypropylene resin.

The Mw/Mn can be controlled to within the range described above by properly setting the polymerization time, the amount of a polar substance, etc. added, or the polymerization temperature.

In the GPC measurement of the hydrogenated block copolymer (a) as described above, the total content of a component having a weight average molecular weight twice or more the peak weight average molecular weight (hereinafter, also referred to as a high molecular weight component) and a component having a weight average molecular weight 0.5 times or less the peak weight average molecular weight (hereinafter, also referred to as a low molecular weight component) is preferably 15% or less from the viewpoint of the low blocking of the hydrogenated block copolymer and from the viewpoint of the low stickiness of a molding of the resulting polypropylene resin composition. From similar viewpoints, the total content of the high molecular weight component and the low molecular weight component is more preferably 13% or less, further preferably 10% or less. The content of the high molecular weight component and the low molecular weight component can be controlled to within the range described above by polymerization conditions such as polymerization temperature.

The Bragg plane spacing of the hydrogenated block copolymer (a) is preferably 25 nm or larger and 47 nm or smaller, more preferably 28 nm or larger and 46 nm or smaller, further preferably 30 nm or larger and 45 nm or smaller, from the viewpoint of workability. The Bragg plane spacing is a value calculated from the primary peak obtained from small angle X ray scattering (SAXS) analysis and can be determined by a method described in Examples mentioned later. A g-factor obtained in the SAXS analysis is preferably 0.11 to 0.25, more preferably 0.12 to 0.24, further preferably 0.13 to 0.23, from the viewpoint of workability. The g-factor is an index representing a disorder of a microphase separated structure. A larger value of the g-factor means a larger degree of the disorder. The Bragg plane spacing and the g-factor can be controlled to within the ranges described above, for example, by adjusting a preferred polymerization temperature mentioned later, the content of the polymer block (C) or (S), a vinylating agent such as a polar compound or a Lewis base (e.g., ether or amine) used in polymerization, or the degree of hydrogenation.

<Method for Producing Hydrogenated Block Copolymer>

The method for producing the hydrogenated block copolymer is not particularly limited. The hydrogenated block copolymer can be produced, for example, by performing polymerization in an organic solvent with an organic alkali metal compound as a polymerization initiator to obtain a block copolymer, followed by hydrogenation reaction. The mode of polymerization may be batch polymerization, continuous polymerization, or a combination thereof. A batch polymerization method is preferred from the viewpoint of obtaining a block copolymer having a narrow molecular weight distribution and high strength.

The polymerization temperature is generally 0 to 150° C., preferably 20 to 120° C., more preferably 40 to 100° C., further preferably 55 to 65° C. The difference in polymerization temperature in forming the polymer block (B) is preferably 20° C. or less, more preferably 15° C. or less, further preferably 10° C. or less, from the viewpoint of equalizing the respective vinyl contents of polymer blocks. In the present embodiment, the term "difference in polymerization temperature" means the difference between the highest polymerization temperature and the lowest polymerization temperature in forming the polymer block (B). The polymerization time differs depending on the polymer of interest and is usually 24 hours or shorter, preferably 0.1 to 10 hours. The polymerization time is more preferably 0.5 to 3 hours from the viewpoint of obtaining a block copolymer having a narrow molecular weight distribution and high strength. The atmosphere of the polymerization system is not particularly limited and can have any pressure range sufficient for maintaining nitrogen and a solvent in a liquid phase. It is preferred that impurities, for example, water, oxygen, and carbon dioxide, which inactivate an initiator and living polymers should be absent in the polymerization system.

Examples of the organic solvent include, but are not particularly limited to: aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

The organic alkali metal compound serving as a polymerization initiator is preferably an organolithium compound. An organic monolithium compound, an organic dilithium compound, or an organic polylithium compound is used as the organolithium compound. Specific examples of the organolithium compound include, but are not limited to, ethyl lithium, n-propyl lithium, isopropyl lithium, n-butyl lithium, sec-butyl lithium, t-butyl lithium, phenyl lithium, hexamethylene dilithium, butadienyl lithium, and isopropenyl dilithium. Among them, n-butyl lithium or sec-butyl lithium is preferred from the viewpoint of polymerization activity.

The amount of the organic alkali metal compound used as a polymerization initiator depends on the molecular weight of the block copolymer of interest and is generally preferably in the range of 0.01 to 0.5 phm (parts by mass based on 100 parts by mass of monomers), more preferably in the range of 0.03 to 0.3 phm, still more preferably in the range of 0.05 to 0.15 phm.

The vinyl bond content of the hydrogenated block copolymer can be adjusted by using a compound such as a Lewis base, for example, ether or amine, as a vinylating agent. The amount of the vinylating agent used can be adjusted according to the vinyl bond content of interest. Also, polymer blocks differing in vinyl bond content can be produced in polymer blocks each having a conjugated diene compound as a main component, by adding the vinylating agent and a metal alkoxide mentioned later under two or more divided conditions.

Examples of the vinylating agent include, but are not limited to, ether compounds, ether-containing compounds having two or more oxygen atoms, and tertiary amine compounds.

Examples of the tertiary amine compounds include, but are not limited to, pyridine, N,N,N',N'-tetramethylethylenediamine, tributylamine, tetramethylpropanediamine, 1,2-dipiperidinoethane, and bis[2-(N,N-dimethylamino)ethyl] ether. These compounds may be used alone or may be used in combination of two or more. The tertiary amine compound is preferably a compound having two amines. Among others, a compound having a structure that exhibits symmetry in the molecule is more preferred, and N,N,N',N'-tetramethylethylenediamine, bis[2-(N,N-dimethylamino)ethyl] ether, or 1,2-dipiperidinoethane is further preferred.

In the present embodiment, the copolymerization for the hydrogenated block copolymer may be performed in the presence of the coexisting vinylating agent mentioned above, organolithium compound, and alkali metal alkoxide. In this context, the alkali metal alkoxide is a compound represented by the general formula MOR (wherein M is an alkali metal, and R is an alkyl group).

The alkali metal of the alkali metal alkoxide is preferably sodium or potassium from the viewpoint of a high vinyl bond content, a narrow molecular weight distribution, a high polymerization rate, and a high block content. The alkali metal alkoxide is not limited and is preferably sodium alkoxide, lithium alkoxide, or potassium alkoxide having an alkyl group having 2 to 12 carbon atoms, more preferably sodium alkoxide or potassium alkoxide having an alkyl group having 3 to 6 carbon atoms, further preferably sodium t-butoxide, sodium t-pentoxide, potassium t-butoxide, or potassium t-pentoxide. Among them, sodium t-butoxide or sodium t-pentoxide which is sodium alkoxide is still further preferred.

In the case of polymerizing a vinyl aromatic compound and a conjugated diene compound in the presence of the coexisting vinylating agent, organolithium compound, and alkali metal alkoxide in the polymerization step for the hydrogenated block copolymer according to the present embodiment, the molar ratio of the vinylating agent to the organolithium compound (vinylating agent/organolithium compound) and the molar ratio of the alkali metal alkoxide to the organolithium compound (alkali metal alkoxide/organolithium compound) are preferably the following molar ratios for the coexistence:

vinylating agent/organolithium compound of 0.2 to 3.0, and alkali metal alkoxide/organolithium compound of 0.01 to 0.3.

The vinylating agent/organolithium compound molar ratio is preferably 0.2 or more from the viewpoint of a high vinyl bond content and a high polymerization rate and is preferably less than 3.0 from the viewpoint of obtaining a narrow molecular weight distribution and high hydrogenation activity. The alkali metal alkoxide/organolithium compound molar ratio is preferably 0.01 or more from the viewpoint of a high vinyl bond content, a high polymerization rate, and a high block content and is preferably 0.3 or less from the viewpoint of obtaining a narrow molecular weight distribution and high hydrogenation activity. This achieves improvement in polymerization rate and can increase the vinyl bond content of the hydrogenated block copolymer of interest. In addition, this can narrow a molecular weight distribution and further tends to improve a block content. As a result, performance to be imparted to a polypropylene resin composition, i.e., low anisotropy, flexibility, transparency, smoothness, low stickiness, kink resistance, and strain recovery, tend to be further improved.

The vinylating agent/organolithium compound molar ratio in the polymerization step is more preferably 0.8 or more from the viewpoint of a high vinyl bond content and a high polymerization rate, further preferably 2.5 or less from the viewpoint of a narrow molecular weight distribution and high hydrogenation activity, and still further preferably in the range of 1.0 or more and 2.0 or less.

The alkali metal alkoxide/organolithium compound molar ratio is more preferably 0.02 or more from the viewpoint of a high vinyl bond content, a high polymerization rate, and a high block content, further preferably 0.2 or less from the viewpoint of a narrow molecular weight distribution and high hydrogenation activity, still further preferably 0.03 or more and 0.1 or less, even further preferably 0.03 or more and 0.08 or less.

The alkali metal alkoxide/vinylating agent molar ratio is preferably 0.010 or more from the viewpoint of a high vinyl bond content, a high polymerization rate, and a high block content and is preferably 0.100 or less from the viewpoint of achieving a narrow molecular weight distribution and obtaining high hydrogenation activity. The alkali metal alkoxide/vinylating agent molar ratio is more preferably 0.012 or more and 0.080 or less, further preferably 0.015 or more and 0.06 or less, still further preferably 0.015 or more and 0.05 or less.

In the present embodiment, the hydrogenated block copolymer is particularly preferably produced by the following method: the method for producing the hydrogenated block copolymer according to the present embodiment, wherein in the polymerization step mentioned above, the difference in polymerization temperature in forming the polymer block (B) is preferably within 20° C., and a value obtained from $V_H$–$V_L$ is preferably 10 mol % or less wherein, when the polymer block (B) is divided into a first region to a sixth region in order from a polymerization start side, each region having an equal mass, $V_H$ and $V_L$ represent the highest value and the lowest value, respectively, of vinyl bond contents before hydrogenation of the first region to the sixth region. Such a polymerization step controls the height of the tan δ peak obtained by subjecting the hydrogenated block copolymer to dynamic viscoelasticity measurement (1 Hz), and the width at half height of the tan δ peak to within the preferred ranges, tends to further improve the flexibility and low hysteresis loss of the hydrogenated block copolymer, and tends to further improve the flexibility, kink resistance, and strain recovery of a molding of the resulting polypropylene resin composition.

An inactivating agent for the vinylating agent can also be used as an approach of producing blocks differing in vinyl bond content in polymer blocks each having a conjugated diene compound as a main component. Examples of the inactivating agent include alkyl metal compounds. The inactivating agent is selected from alkyl aluminum, alkyl zinc, and alkyl magnesium having 1 to 20 carbon atoms per alkyl substituent, and mixtures thereof.

In the present embodiment, the hydrogenation method is not particularly limited. For example, the block copolymer obtained as described above can be hydrogenated by the supply of hydrogen in the presence of a hydrogenation catalyst to obtain a hydrogenated block copolymer having the hydrogenated double bond residues of conjugated diene compound units.

The hydrogenated block copolymer can be pelletized to produce pellets of the hydrogenated block copolymer. Examples of the pelletizing method include, but are not particularly limited to: a method of extruding the hydrogenated block copolymer into strands from a single-screw or twin-screw extruder, and cutting the strands in water using a rotating blade fitted in front of a die; a method of extruding the hydrogenated block copolymer into strands from a single-screw or twin-screw extruder, cooling the strands in water or in air, and then cutting the strands using a strand cutter; and a method of melt-mixing the hydrogenated block copolymer with an open roll or a Banbury mixer, then molding the hydrogenated block copolymer into a sheet using a roll, further cutting the sheet into strips, and then cutting the strips into cube-shaped pellets using a pelletizer. The molding of the hydrogenated block copolymer pellets is not particularly limited by its size or shape.

The hydrogenated block copolymer, preferably, the pellets thereof, can be blended, if necessary, with a pellet blocking prevention agent for the purpose of preventing pellet blocking. Examples of the pellet blocking prevention agent include, but are not particularly limited to, calcium stearate, magnesium stearate, zinc stearate, polyethylene, polypropylene, ethylenebisstearamide, talc, and amorphous silica. Calcium stearate, polyethylene, or polypropylene is preferred from the viewpoint of the transparency of the resulting random polypropylene composition and a tube-shaped molding or a sheet-shaped molding comprising the same. The preferred amount thereof is 500 to 6000 ppm based on the hydrogenated block copolymer. The more preferred amount thereof is 1000 to 5000 ppm based on the hydrogenated block copolymer. The pellet blocking prevention agent is preferably blended in a state attached to pellet surface and may be contained to some extent in the inside of the pellets.

<Polypropylene Resin Composition>

The polypropylene resin composition of the present embodiment comprises 10 to 90% by mass of the hydrogenated block copolymer of the present embodiment and 10 to 90% by mass of a polypropylene resin.

The content of the hydrogenated block copolymer in the polypropylene resin composition is 90% by mass or less from the viewpoint of the low anisotropy, smoothness, and low stickiness of a molding of the resulting polypropylene resin composition and is 10% by mass or more from the viewpoint of the flexibility, transparency, smoothness, kink resistance, and strain recovery of a molding of the resulting polypropylene resin composition.

The content of the hydrogenated block copolymer is preferably 15 to 85% by mass, more preferably 20 to 80% by mass, further preferably 25 to 70% by mass, and the content of the polypropylene resin is preferably 15 to 85% by mass, more preferably 20 to 80% by mass, further preferably 25 to 75% by mass, from the viewpoint of the performance balance among the flexibility, transparency, kink resistance, and strain recovery of a molding of the polypropylene resin composition.

In the polypropylene resin composition of the present embodiment, the intensity ratio of diffraction peak intensity (I14) at a scattering angle (2θ) of 14° to diffraction peak intensity (I15) at a scattering angle (2θ) of 15°, I14/I15, in wide angle X ray diffractometry is preferably 0.1 or more and less than 1.4, from the viewpoint of the flexibility and transparency of a molding of the resulting polypropylene resin composition. From similar viewpoints, the intensity ratio is more preferably 0.1 to 1.35, further preferably 0.1 to 1.30. The intensity ratio can be measured by a method described in Examples mentioned later.

In this context, the peak intensity ratio is a value ascribable to the crystallinity of the polypropylene resin composition and can be controlled by, for example, the content of the polymer block (C) or the polymer block (S) in the hydrogenated block copolymer. As the contents of these polymer blocks are increased, the peak intensity ratio tends to be larger.

In the measurement of the polypropylene resin composition of the present embodiment or a molding thereof by cross fractionation chromatography (hereinafter, also referred to as "CFC"), preferably, an integral elution volume at −20° C. or lower is 0.1% or more and less than 50% of the total volume, an integral elution volume in the range of higher than −20° C. and lower than 60° C. is 10% or more and less than 90% of the total volume, and an integral elution volume in the range of 60° C. or higher and 150° C. or lower is 10% or more and less than 90% of the total volume. The "total volume" means the total volume of the polypropylene resin composition or the molding subjected to CFC measurement.

When the behavior described above is observed, the balance among the low temperature impact resistance, flexibility, transparency, and low stickiness of a molding of the resulting polypropylene resin composition tends to be better.

From similar viewpoints, the integral elution volume of the components soluble at −20° C. or lower is more preferably 0.1% or more and less than 20%, further preferably 0.1% or more and less than 10%, of the total volume. The integral elution volume in the range of higher than −20° C. and lower than 60° C. is more preferably 15% or more and less than 85%, further preferably 20% or more and less than 80%, of the total volume. The integral elution volume in the range of 60° C. or higher and 150° C. or lower is more preferably 15% or more and less than 85%, further preferably 20% or more and less than 80%, of the total volume.

The CFC elution volumes can be controlled by, for example, the ratio of the polymer block (C) or (B), the blending ratio of the hydrogenated block copolymer (a), or the type of the polypropylene resin. The CFC elution volumes can be measured by a method described in Examples mentioned later.

In the CFC measurement, the molecular weight distribution (Mw/Mn) of an eluted component in the range of 10° C. or higher and lower than 60° C. is preferably 1.05 or more and 1.50 or less. When the behavior described above is observed, the balance among the flexibility, transparency, and low stickiness of a molding of the resulting polypropylene resin composition tends to be better.

From similar viewpoints, the Mw/Mn of an eluted component in the range of 10° C. or higher and lower than 60° C. is more preferably 1.07 or more and 1.45 or less, further preferably 1.1 or more and 1.4 or less.

The Mw/Mn in the range of 10° C. or higher and lower than 60° C. measured by CFC can be controlled to within the numerical range described above by properly setting the type of polypropylene, the polymerization time of the hydrogenated block copolymer (a), the amount of a polar substance, etc. added, or the polymerization temperature.

Examples of the polypropylene resin include random polypropylene resins, homopolypropylene resins, and block polypropylene resins. The polypropylene resin is preferably a random polypropylene resin.

In this context, the term "random" for the random polypropylene means that propylene and monomers other than propylene are copolymerized so that the monomers other than propylene are randomly incorporated into the propylene chain so as not to substantially form a chain of the monomers other than propylene.

The random polypropylene is not particularly limited as long as the content of the propylene unit is less than 99% by mass. Preferred examples of the random polypropylene include random copolymers of propylene and ethylene, and random copolymers of propylene and α-olefins having 4 to 20 carbon atoms. In the case of using a random copolymer of propylene and ethylene or a random copolymer of propylene and an α-olefin having 4 to 20 carbon atoms as the random polypropylene, flexibility, transparency, impact resistance, and kink resistance tend to be better.

Examples of the α-olefin include, but are not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. An α-olefin having 2 to 8 carbon atoms is preferred. Examples thereof include ethylene, 1-butene, 3-methyl-1-butene, 1-hexene, and 4-methyl-1-pentene. These α-olefins can be used alone or in combination of two or more. Also, the random polypropylene can also be used alone or in combination of two or more.

Among the random polypropylenes, at least one member selected from the group consisting of a propylene-ethylene random copolymer, a propylene-1-butene random copolymer, and a propylene-ethylene-1-butene ternary random copolymer is more preferably used from the viewpoint of the flexibility, transparency, impact resistance, and kink resistance of the resulting random polypropylene composition and a tube-shaped molding or a sheet-shaped molding comprising the same.

The random polypropylene is a random copolymer of propylene and ethylene or a random copolymer of propylene and an α-olefin having 4 to 12 carbon atoms, wherein the content of the ethylene or α-olefin unit in the random polypropylene is preferably more than 1% by mass and less than 40% by mass, and the content of the propylene unit is preferably 60% by mass or more and less than 99% by mass, from the viewpoint of flexibility, transparency, low stickiness, impact resistance, and kink resistance. From similar viewpoints, the content of the ethylene or α-olefin unit is more preferably more than 2% by mass and less than 30% by mass, further preferably 2.5% by mass or more and less than 25% by mass, still further preferably 3% by mass or more and less than 20% by mass. The content of the propylene unit is more preferably 70% by mass or more and less than 98% by mass, further preferably 75% by mass or more and less than 97.5% by mass, still further preferably 80% by mass or more and less than 97% by mass.

The melt flow rate (MFR; conforming to ISO 1133, 230° C.) of the random polypropylene is preferably 1 to 30 g/10 minutes, more preferably 1 to 25 g/10 minutes, further preferably 2 to 20 g/10 minutes, still further preferably 3 to 15 g/10 minutes, from the viewpoint of the workability and low stickiness of the resulting random polypropylene composition.

The catalyst for use in producing the random polypropylene is not particularly limited. For example, a polymerization method using a stereoregular catalyst is preferred. Examples of the stereoregular catalyst include, but are not limited to, Ziegler catalysts and metallocene catalysts. Among these catalysts, a metallocene catalyst is preferred from the viewpoint of the low stickiness, tear strength, impact resistance, and kink resistance of the resulting random polypropylene composition and a tube-shaped molding or a sheet-shaped molding comprising the same.

The molecular weight distribution (Mw/Mn) of the random polypropylene is preferably 3.5 or less from the viewpoint of the low stickiness, tear strength, impact resistance, and kink resistance of the resulting random polypropylene composition and a tube-shaped molding or a sheet-shaped molding comprising the same. The Mw/Mn is more preferably 3.0 or less, further preferably 2.8 or less. The lower limit is not particularly limited and is preferably 1.5 or more. Particularly preferably, the random polypropylene is obtained by polymerization using a metallocene catalyst, and its molecular weight distribution (Mw/Mn) is 1.5 or more and 3.5 or less. The molecular weight distribution of the random polypropylene is determined from the ratio of a weight average molecular weight (Mw) to a number average molecular weight (Mn) obtained by GPC measurement.

The polypropylene composition of the present embodiment may additionally contain other additives according to the required performance. Examples of the additives include, but are not particularly limited to, flame retardants, stabilizers, coloring agents, pigments, antioxidants, antistatic agents, dispersing agents, flow enhancing agents, mold release agents such as stearic acid metal salts, silicone oils, mineral oil softening agents, synthetic resin softening agents, copper inhibitors, cross-linking agents, and nucleating agents.

<Method for Producing Polypropylene Resin Composition>

The polypropylene composition of the present embodiment can be produced by, for example, a method of dry-blending the hydrogenated block copolymer of the present embodiment, polypropylene, and other components to be optionally added according to the compositional ratio of each component, or a preparation method using an apparatus that is subjected to the usual mixing of polymer materials, though the production method is not limited thereto.

In this respect, examples of the mixing apparatus that may be used include, but are not particularly limited to, kneading apparatuses such as Banbury mixers, Labo Plastomill, single-screw extruders, and twin-screw extruders. Production by a melt mixing method using an extruder is preferred from productivity and good kneadability. The melting temperature for kneading can be appropriately set and is usually in the range of 130 to 300° C., preferably in the range of 150 to 250° C.

<Molding>

The molding of the present embodiment comprises the polypropylene resin composition of the present embodiment. Examples of the molding can include, but are not limited to, sheet-shaped moldings (sheets and films), tubes, bags, medical moldings, for example, medical tubes, medical films, and medical infusion bags, and packaging materials, for example, food packaging materials and apparel packaging materials.

The molding of the present embodiment can be obtained by a molding method mentioned below. The molding method, for example, for a tube, is not particularly limited. For example, the polypropylene resin composition is charged into an extruder and molten, and the resultant can be tubulated through a die and cooled in water or in air to prepare a tube. A single-screw or multiple-screw extruder can be used as the extruder. Also, a multi-layer tube can be formed by multi-layer extrusion using a plurality of extruders. Alternatively, the polypropylene resin composition may be molded directly into a tube from the extruder used for producing the polypropylene resin composition.

The shape of the tube is not particularly limited. For example, a round or oval tube is usually used. The diameter of the tube is not particularly limited and is, for example, preferably, 1 to 50 mm, more preferably 2 to 30 mm, further preferably 3 to 20 mm, in terms of outside diameter. The thickness of the tube is preferably 0.3 to 30 mm, more preferably 0.4 to 20 mm, further preferably 0.5 to 10 mm.

The tube of the present embodiment may be prepared as a multi-layer tube by laminating an additional polymer without inhibiting the purpose of the present embodiment. The polymer can be used alone or in combination of two or more as a single layer or as a multi-layer laminate that may differ in type among the layers. The layer composed of the polymer in the tube having such a multi-layer structure may be positioned as an innermost layer, an intermediate layer, or an outermost layer according to the desired performance to be imparted. In the present embodiment, a reinforcing yarn braid or a helical reinforcing body can be wrapped around the tube so as to prepare a pressure-resistant tube (hose) for improving pressure resistance, etc. while maintaining flexibility by suppressing increase in thickness. The reinforcing yarn braid is disposed in the inside or between layers in the thickness direction, and can employ vinylon, polyamide, polyester, aramid fiber, carbon fiber, metal wire, or the like. The helical reinforcing body is disposed at the outer circumference and can employ a metal, a plastic, or the like.

The method for producing the sheet-shaped molding of the present embodiment is not particularly limited. For example, a T-die method or an inflation method can be adopted as an extrusion molding method of charging the polypropylene resin composition into an extruder. For example, usual air-cooling inflation molding, air-cooling two-stage inflation molding, high-speed inflation molding, or water-cooling inflation molding can be adopted as the inflation molding. Also, a blow molding method such as direct blow or injection blow, or a press molding method can be adopted. A single-screw or multiple-screw extruder can be used as the extruder. Also, a multi-layer sheet can be formed by multi-layer extrusion using a plurality of extruders. Alternatively, the polypropylene resin composition may be molded directly into a sheet from the extruder used for producing the polypropylene resin composition.

In general, a sheet-shaped molding having a thickness of 0.005 mm or larger and smaller than 0.2 mm is referred to as a film, and a sheet-shaped molding having a thickness of 0.2 mm or larger and 50 mm or smaller is referred to as a sheet. In the specification of the present application, the "sheet-shaped molding" encompasses the film and the sheet. The thickness of the sheet-shaped molding of the present embodiment is not particularly limited and is preferably in the range of 0.005 mm to 0.5 mm, more preferably 0.01 mm to 0.3 mm, from the viewpoint of processability, flexibility, etc.

In the present embodiment, the extrusion temperature in the case of producing the sheet-shaped molding by the T-die method can be appropriately set and is usually in the range of 130 to 300° C., preferably in the range of 180 to 250° C. In the present embodiment, the sheet-shaped molding extruded from a T-die is clamped and pressed, and cooled with a cooling roll, and conveyed to a next apparatus. In this context, one or more cooling rolls may be used, and a plurality of cooling rolls are preferred. In the case of using, for example, a pair of cooling rolls composed of two rolls (first roll and second roll), the sheet-shaped molding thus clamped and pressed, and cooled is conveyed to a next apparatus via the second roll. In the present embodiment, the cooling roll means a roll that can adjust the temperature of the surface by using a cooling medium. The molten extrudate discharged from the T-die comes into contact with the cooling roll so that the extrudate is cooled to the surface temperature of the cooling roll. Preferred examples of the surface material of the cooling roll include, but are not particularly limited to, chromium plating. For adjusting the intensity ratio (I14/I15) of the resulting sheet-shaped molding to less than 1.4 and improving transparency, and anisotropy, it is preferred to set a T-die lip opening to 0.2 mm to 1.2 mm. If the T-die lip opening is smaller than 0.2 mm, the extruded resin molding is rapidly quenched so that sufficient crystal growth does not occur. Nonetheless, the crystals have a large size due to rapid crystallization after being brought back to room temperature. Therefore, the intensity ratio (I14/I15) tends to be larger. On the other hand, if the T-die lip opening is larger than 1.2 mm, the extruded resin molding has a large thickness. Therefore, the cooling rate differs between the surface portion and the central portion in the thickness direction. Particularly, the cooling rate is slow in the central portion in the thickness direction where crystallization therefore proceeds by heat. Thus, the intensity ratio (I14/I15) tends to be larger.

The surface temperature of the cooling roll is preferably 25 to 85° C., more preferably 30 to 70° C., further preferably 35 to 60° C. If the temperature of the cooling roll is lower than 25° C., the molten resin composition is quenched so that sufficient crystal growth does not occur. Nonetheless, the crystals have a large size due to rapid crystallization after being brought back to room temperature. Therefore, the intensity ratio (I14/I15) tends to be larger. On the other hand, if the temperature of the cooling roll is higher than 85° C., the crystallization of the molten resin composition proceeds by heat. Thus, the intensity ratio (I14/I15) tends to be larger. In the case of using a plurality of cooling rolls, it is preferred that the surface temperatures of the second and subsequent rolls should also be 25 to 85° C., though the molding is most susceptible to the surface temperature of the first roll. After the completion of clamping and pressing with the cooling roll, the sheet-shaped molding is conveyed to a take-up roll. In this respect, when the sheet-shaped molding has small tack strength against the cooling roll, the sheet-shaped molding tends to be smoothly transferred to the take-up roll, be prevented from being roughened on detached face, and be more likely to have excellent transparency. Thus, the tack strength against the cooling roll falls within a proper range by controlling the temperature of the cooling roll to within the range mentioned above. The resulting sheet-shaped molding is more smoothly transferred to the take-up roll. The method for controlling the surface temperature of the cooling roll is not particularly limited. A method usually carried out, for example, a method of circulating a heating medium such as hot water, steam under pressure, or heated oil in a jacket fitted in the inside of the roll, is used. The surface temperature of the roll according to the present embodiment is the temperature of roll surface at a site repetitively contacted with the sheet-shaped molding and is measured using an infrared thermometer or the like.

The take-up rate is preferably 1 m/min to 10 m/min. If the take-up rate is lower than 1 m/min, the resin molding has a large thickness. Accordingly, the cooling rate is slowed down so that crystallization proceeds. Therefore, the intensity ratio (I14/I15) tends to be larger. On the other hand, if the take-up rate is 10 m/min or higher, the oriented crystallization of the resin molding proceeds. Therefore, the intensity ratio (I14/I15) tends to be larger.

The sheet-shaped molding of the present embodiment may be prepared as a single-layer sheet or may be prepared as a multi-layer sheet by laminating an additional polymer without inhibiting the purpose of the present embodiment.

Examples of such an additional polymer include, but are not limited to: olefin polymers such as polypropylene, polyethylene, ethylene-propylene copolymer rubber (EPM), and ethylene-propylene-non-conjugated diene copolymer rubber (EPDM); polyester polymers such as polyester elastomers, polyethylene terephthalate, and polybutylene terephthalate; polyamide resins such as polyamide 6, polyamide 6.6, polyamide 6.10, polyamide 11, polyamide 12, and polyamide 6.12; acrylic resins such as methyl polyacrylate and methyl polymethacrylate; polyoxymethylene resins such as polyoxymethylene homopolymers and polyoxymethylene copolymers; styrene resins such as styrene homopolymers, acrylonitrile-styrene resins, and acrylonitrile-butadiene-styrene resins; polycarbonate resins; styrene elastomers such as styrene-butadiene copolymer rubber and styrene-isoprene copolymer rubber, and hydrogenation products and modification products thereof; natural rubber; synthetic isoprene rubber and liquid polyisoprene rubber, and hydrogenation products and modification products thereof; chloroprene rubber; acrylic rubber; butyl rubber; acrylonitrile-butadiene rubber; epichlorohydrin rubber; silicone rubber; fluorocarbon rubber; chlorosulfonated polyethylene; urethane rubber; polyurethane elastomers; polyamide elastomers; polyester elastomers; and soft vinyl chloride resins.

These additional polymers can be used alone or as a blend of two or more as a single layer or as a multi-layer laminate that may differ in type among the layers.

For the lamination with the additional polymer, a coextrusion molding method (e.g., a multi-layer T-die method, a multi-layer inflation method, and an extrusion lamination method), a general multi-layer sheet or film molding method (e.g., wet lamination, dry lamination, and press molding), or a blow molding method (e.g., multi-layer injection blow such as coinjection blow, and multi-layer direct blow) can be adopted.

The molded multi-layer laminate may be undrawn or may be drawn uniaxially or biaxially.

The bag refers to a pouched molding that can be formed from the sheet-shaped molding of the present embodiment. Examples of the bag include bags for food packaging, bags for apparel packaging, medical bags, for example, medical infusion bags, and bags for chemical packaging.

<Tacky Film>

The tacky film of the present embodiment comprises: a substrate film; and a tacky layer comprising the hydrogenated block copolymer of the present embodiment, the tacky layer being disposed on the substrate film.

The tacky layer of the tacky film of the present embodiment may contain a tackifier.

The tackifier is not particularly limited as long as the tackifier is a resin capable of imparting viscosity to the tacky layer. Examples thereof include known tackifiers such as hydrogenated terpene resins, rosin terpene resins, hydrogenated rosin terpene resins, aromatic modified hydrogenated terpene resins, coumarone resins, phenol resins, terpene phenol resins, hydrogenated terpene phenol resins, aromatic hydrocarbon resins, and aliphatic hydrocarbon resins.

Particularly, a hydrogenated terpene resin, an aromatic modified hydrogenated terpene resin, a hydrogenated terpene phenol resin, or a terpene phenol resin is preferred.

These tackifiers may be used alone or may be used as a mixture of two or more.

Specific examples of the tackifier that can be used include those described in "Chemicals for Rubber/Plastics" (ed. by Rubber Digest, Co., Ltd., Japan). Use of the tackifier achieves improvement in tack strength.

The content of the tackifier in the tacky layer is preferably 0.5 to 50% by mass, more preferably 5 to 45% by mass, further preferably 10 to 30% by mass, in the tacky layer.

The tackifier content of 50% by mass or less in the tacky layer is preferred because there is a tendency that: increase in tack can be effectively prevented; and the amount of adhesive deposition upon detaching can be further reduced. The tackifier content of 0.5% by mass or more tends to produce moderate tack strength.

(Substrate Film)

The material of the substrate film is not particularly limited, and any of nonpolar and polar resins can be used.

From the viewpoint of performance, price, etc., preferred examples of the nonpolar resin can include polyethylene and homo or block polypropylene, and preferred examples of the polar resin can include: polyester resins such as polyethylene terephthalate and polybutylene terephthalate; polyamide resins; and ethylene-vinyl acetate copolymers and hydrolysates thereof.

The thickness of the substrate film is preferably 1 mm or smaller, more preferably 300 μm or smaller, further preferably 10 to 200 μm.

The substrate film having a thickness of 10 μm or larger can sufficiently protect an adherend. The substrate film having a thickness of 1 mm or smaller produces a practically good elastic modulus, has good followability to irregularities, and can effectively prevent uplift or peeling.

(Tacky Layer)

The tacky film of the present embodiment has a tacky layer comprising at least the hydrogenated block copolymer (a) on the substrate film. The tacky layer may contain other materials mentioned later.

<Other Materials of Tacky Layer>

(Hydrogenated Block Copolymers (b) and (c))

In the tacky film of the present embodiment, the tacky layer may further comprise 5 to 95% by mass of a hydrogenated block copolymer (b) and/or a hydrogenated block copolymer (c).

Preferably, the hydrogenated block copolymer (b) comprises, in the molecule thereof, a polymer block (B1) having a conjugated diene compound as a main component and a polymer block (S1) having a vinyl aromatic compound as a main component, wherein: in the hydrogenated block copolymer (b), a content of the polymer block (B1) having a conjugated diene compound as a main component is 95 to 70% by mass, and a content of the polymer block (S1) having a vinyl aromatic compound as a main component is 5 to 30% by mass; and a vinyl bond content before hydrogenation of the polymer block (B1) having a conjugated diene compound as a main component is 30 to 100 mol %, and a degree of hydrogenation of the hydrogenated block copolymer (b) is 80 mol % or more.

Also preferably, the hydrogenated block copolymer (c) comprises, in the molecule thereof, a polymer block (B2) comprising a conjugated diene compound and a vinyl aromatic compound and a polymer block (S2) having a vinyl aromatic compound as a main component, wherein: in the hydrogenated block copolymer (c), a content of the polymer block (B2) comprising a conjugated diene compound and a vinyl aromatic compound is 95 to 70% by mass, and a content of the polymer block (S2) having a vinyl aromatic compound as a main component is 5 to 30% by mass; and a degree of hydrogenation of the hydrogenated block copolymer (c) is 80 mol % or more. In this context, the "polymer block comprising a conjugated diene compound and a vinyl aromatic compound" means a polymer block comprising a unit derived from a monomer of a conjugated diene compound and a unit derived from a monomer of a vinyl aromatic compound.

The tacky film configured as described above tends to have more moderate tackiness, low tack increasing properties, and excellent followability to irregularities.

For the hydrogenated block copolymer (b) and the hydrogenated block copolymer (c), the phrase "having . . . as a main component", the respective materials of the conjugated diene compound and the vinyl aromatic compound, the vinyl bond content, and the degree of hydrogenation can be defined and controlled in the same way as in the hydrogenated block copolymer (a) mentioned above.

The hydrogenated block copolymer (b) and the hydrogenated block copolymer (c) can be produced in the same way as the method for producing the hydrogenated block copolymer (a) mentioned above.

(Structural Example of Hydrogenated Block Copolymer (b))

Examples of the hydrogenated block copolymer (b) mentioned above include those having structures represented by the following general formulas:

$$(S1-B1)_n,$$

$$S1-(B1-S1)_n,$$

$$B1-(S1-B1)_n,$$

$$[(B1-S1)_n]_m-Z,$$

$$[(S1-B1)_n]_m-Z,$$

$$[(B1-S1)_n-B1]_m-Z, \text{ and}$$

$$[(S1-B1)_n-S1]_m-Z.$$

In these general formulas, S1 represents the polymer block (S1) having a vinyl aromatic compound as a main component, and B1 represents the polymer block (B1) having a conjugated diene compound as a main component.

The boundary between the polymer block (S1) and the polymer block (B1) is not necessarily required to be clearly defined.

n is an integer of 1 or larger and is preferably an integer of 1 to 5.

m is an integer of 2 or larger and is preferably an integer of 2 to 11, more preferably 2 to 8.

Z represents a residue of a coupling agent. In this respect, the residue of the coupling agent means a residue after coupling by a coupling agent for use in coupling a plurality of copolymers of conjugated diene compound monomer units and vinyl aromatic hydrocarbon compound monomer units between the polymer block (S1) and the polymer block (S1), between the polymer block (B1) and the polymer block (B1), or between the polymer block (S1) and the polymer block (B1).

Examples of the coupling agent include bifunctional coupling agents and polyfunctional coupling agents. Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (S1) and the polymer block (B1) may be uniformly distributed or may be distributed in a tapered pattern. When the polymer block (S1) and the polymer block (B1) form a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

(Structural Example of Hydrogenated Block Copolymer (c))

Examples of the hydrogenated block copolymer (c) mentioned above include those having structures represented by the following general formulas:

$(S2-B2)_n$, $B2-(S2-B2)_n$, $[(B2-S2)_n]_m-Z$, and $[(B2-S2)_n-B2]_m-Z$.

In these general formulas, B2 represents the polymer block comprising a conjugated diene compound and a vinyl aromatic compound, and S2 represents the polymer block (S2) having a vinyl aromatic compound as a main component.

The boundary between the polymer block (S2) and the polymer block (B2) is not necessarily required to be clearly defined.

n is an integer of 1 or larger and is preferably an integer of 1 to 5.

m is an integer of 2 or larger and is preferably an integer of 2 to 11, more preferably 2 to 8.

Z represents a residue of a coupling agent.

In this respect, the coupling residue means a residue after coupling by a coupling agent for use in coupling a plurality of copolymers of conjugated diene compound monomer units and vinyl aromatic hydrocarbon compound monomer units between the polymer block (S2) and the polymer block (S2), between the polymer block (B2) and the polymer block (B2), or between the polymer block (S2) and the polymer block (B2).

Examples of the coupling agent include bifunctional coupling agents and polyfunctional coupling agents.

Examples of the bifunctional coupling agents include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the trifunctional or higher polyfunctional coupling agents include, but are not limited to: trihydric or higher polyalcohols; polyvalent epoxy compounds such as epoxidized soybean oil and diglycidyl bisphenol A; silicon halide compounds represented by the formula $R1_{(4-n)}SiX_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively, dimethyl carbonate, diethyl carbonate, or the like may be used.

In the general formulas described above, the vinyl aromatic compound monomer units in the polymer block (S2) and the polymer block (B2) may be uniformly distributed or may be distributed in a tapered pattern. When the polymer block (S2) and the polymer block (B2) form a copolymer block of vinyl aromatic compound monomer units and conjugated diene compound monomer units, the vinyl aromatic compound monomer units in the copolymer block may include a plurality of uniformly distributed moieties and/or a plurality of tapered distributed moieties. The copolymer block moiety may contain a plurality of moieties differing in vinyl aromatic compound monomer unit content.

(Hydrogenated Styrene Elastomer)

The tacky layer of the tacky film of the present embodiment may further contain a hydrogenated styrene elastomer. Typical examples of the hydrogenated styrene elastomer include, but are not particularly limited to, styrene-butadiene-styrene (SBS), styrene-isoprene-styrene (SIS), styrene-butadiene random polymer (SBR), styrene-ethylene-butylene-styrene (SEBS) prepared by the saturation of SBS by hydrogenation, and styrene-ethylene-propylene-styrene (SEPS). Other examples of the hydrogenated styrene elastomer may include elastomers having a structure such as styrene-ethylene-butylene (SEB), styrene-ethylene-propylene (SEP), or styrene-isobutylene-styrene triblock copolymer (SIBS).

Alternatively, a reactive elastomer derived from the hydrogenated styrene elastomer by the addition of various functional groups may be used. Examples of the functional groups include, but are not limited to, a hydroxy group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronate group, an alkoxy tin group, and a phenyl tin group.

(Olefin Resin and Olefin Elastomer)

The tacky layer of the tacky film of the present embodiment may further contain an olefin resin or an olefin elastomer. Examples of the olefin resin and the olefin elastomer include α-olefin polymers or copolymers having 2 to 20 carbon atoms, and copolymers of ethylene and unsaturated carboxylic acid or unsaturated carboxylic acid ester.

Specific examples thereof include, but are not limited to, ethylene-propylene copolymers, ethylene-1-butene copolymers, ethylene-1-hexene copolymers, ethylene-4-methylpentene copolymers, ethylene-1-octene copolymers, propylene homopolymers, propylene-ethylene copolymers, propylene-ethylene-1-butene copolymers, 1-butene homopolymers, 1-butene-ethylene copolymers, 1-butene-propylene copolymers, 4-methylpentene homopolymers, 4-methylpentene-1-propylene copolymers, 4-methylpentene-1-butene copolymers, 4-methylpentene-1-propylene-1-butene copolymers, propylene-1-butene copolymers, ethylene-vinyl acetate copolymers, ethylene-methacrylic acid copolymers, and ethylene-methyl methacrylate copolymers.

A propylene homopolymer, a propylene-ethylene copolymer, a propylene-1-butene copolymer, a propylene-ethylene-1-butene copolymer, or polyethylene is preferred from the viewpoint of tack strength stability over time.

(Acrylic Copolymer)

The tacky layer of the tacky film of the present embodiment may further contain an acrylic copolymer. Examples of the acrylic copolymer include, but are not particularly limited to, copolymers of methyl acrylate, ethyl acrylate, methyl methacrylate, or acrylonitrile and vinyl acetate, vinyl chloride, or styrene.

(Softening Agent)

The tacky layer of the tacky film of the present embodiment may further contain a softening agent. The softening agent is not particularly limited. For example, any of mineral oil softening agents and synthetic resin softening agents can be used. Examples of the mineral oil softening agents generally include mixtures of aromatic hydrocarbons, naphthenic hydrocarbons, and paraffinic hydrocarbons. In general, an oil in which a paraffinic hydrocarbon carbon atom number accounts for 50% or more of the total number of carbon atoms is referred to as a paraffinic oil; an oil in which a naphthenic hydrocarbon carbon atom number accounts for 30% to 45% of the total number of carbon atoms is referred to as a naphthenic oil; and an oil in which an aromatic hydrocarbon carbon atom number accounts for 35% or more of the total number of carbon atoms is referred to as an aromatic oil. The mineral oil softening agent is preferably a paraffinic oil serving as a softening agent for rubber. The synthetic resin softening agent is preferably polybutene, low molecular weight polybutadiene, or the like. The softening agent contained therein tends to further improve the tackiness of the tacky film of the present embodiment.

The content of the softening agent in the tacky layer of the tacky film of the present embodiment is preferably 0 to 100 parts by mass, more preferably 0.1 to 80 parts by mass, based on 100 parts by mass in total of the hydrogenated block copolymer (a), the hydrogenated block copolymer (b), and the hydrogenated block copolymer (c) mentioned above from the viewpoint of suppressing the bleeding of the softening agent and securing practically sufficient tack strength.

(Antioxidant, Light Stabilizer, Etc.)

The tacky layer of the tacky film of the present embodiment may be further supplemented with a stabilizer such as an antioxidant or a light stabilizer.

Examples of the antioxidant include, but are not limited to: hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)] acrylate; sulfur antioxidants such as dilauryl thiodipropionate and lauryl stearyl thiodipropionate pentaerythritoltetrakis(β-laurylthiopropionate); and phosphorus antioxidants such as tris(nonylphenyl)phosphite and tris(2,4-di-t-butylphenyl)phosphite.

Examples of the light stabilizer include, but are not limited to: benzotriazole ultraviolet absorbers such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

(Pigment, Wax, Thermoplastic Resin, Natural Rubber, and Synthetic Rubber)

The tacky layer of the tacky film of the present embodiment can also contain various additives, if necessary, in addition to those mentioned above.

Examples of the additives include, but are not limited to: pigments such as colcothar and titanium dioxide; waxes such as paraffin wax, microcrystalline wax, and low molecular weight polyethylene wax; polyolefin or low molecular weight vinyl aromatic thermoplastic resins such as amorphous polyolefin and ethylene-ethyl acrylate copolymers; natural rubber; and synthetic rubbers such as polyisoprene rubber, polybutadiene rubber, styrene-butadiene rubber, ethylene-propylene rubber, chloroprene rubber, acrylic rubber, isoprene-isobutylene rubber, and polypentenamer rubber. Examples of the synthetic rubbers include those described above as well as those described in "Chemicals for Rubber/Plastics" (ed. by Rubber Digest, Co., Ltd., Japan).

(Saturated Fatty Acid Bisamide)

The tacky layer of the tacky film of the present embodiment can contain a saturated fatty acid bisamide, which is effective for suppressing increase in tack.

Examples of the saturated fatty acid bisamide include, but are not limited to: saturated fatty acid aliphatic bisamides such as ethylenebisstearamide (EBSA), methylenebisstearamide, and hexamethylenebisstearamide; and saturated fatty acid aromatic bisamides such as m-xylylenebisstearamide and N,N'-distearylisophthalamide.

Among the saturated fatty acid aliphatic bisamides, ethylenebisstearamide is more preferred.

Among the saturated fatty acid aromatic bisamides, m-xylylenebisstearamide is more preferred.

These saturated fatty acid bisamides may be used alone or may be used in combination of two or more.

The tack layer may further contain a styrene block phase reinforcing agent, which is effective for suppressing increase in tack. Examples of the styrene block phase reinforcing agent include, but are not limited to, styrene and styrene compounds such as α-methylstyrene, p-methylstyrene, p-chlorostyrene, chloromethylstyrene, tert-butylstyrene, p-ethylstyrene, and divinylbenzene, as monomer units. These agents may be used alone or may be used in combination of two or more.

<Method for Producing Resin Material Forming Tacky Layer of Tacky Film>

The resin material forming the tacky layer of the tacky film of the present embodiment can be produced by, for example, a method of dry-blending the hydrogenated block copolymer (a), the hydrogenated block copolymer (b), the hydrogenated block copolymer (c), and other components to be optionally added, or a preparation method using an apparatus that is subjected to the usual mixing of polymer materials.

Examples of the mixing apparatus include, but are not particularly limited to, kneading apparatuses such as Banbury mixers, Labo Plastomill, single-screw extruders, and twin-screw extruders. Production by a melt mixing method using an extruder is preferred from productivity and good kneadability.

Particularly, in the case of blending a tackifier, the dry blending method described above may be used, or a master batch may be prepared by kneading the hydrogenated block copolymer (a), (b), or (c) in advance thereinto because the tackifier is strongly sticky and poorly handleable due to its flake form. The melting temperature for kneading can be appropriately set and is usually in the range of 130 to 300° C., preferably in the range of 150 to 250° C.

The resin material forming the tacky layer of the present embodiment may be subjected to blowing treatment in order to achieve weight reduction, softening, and an improving effect on adhesion.

Examples of the blowing method include, but are not limited to, chemical methods, physical methods, and exploitation of thermally expandable microballoons. These methods can employ the addition of chemical blowing agents (e.g., inorganic blowing agents and organic blowing agents), the addition of physical blowing agents, and the addition of thermally expandable microballoons, respectively, to distribute air bubbles in the inside of the material. Alternatively, weight reduction, softening, and improvement in adhesion may be achieved by the addition of a hollow filler (already expanded balloon).

<Method for Producing Tacky Film>

The tacky film of the present embodiment has a tacky layer comprising the hydrogenated block copolymer, on a substrate film.

Examples of the method for producing the tacky film of the present embodiment include, but are not particularly limited to, a method of coating a substrate film with a solution or a molten form of the resin material forming the tacky layer, and a method using a film extruder.

In this context, in the case of using a solution or a molten form of the resin material forming the tacky layer, a composition may be prepared and then dissolved or molten, or a solution or a molten form of the hydrogenated block copolymer (a) supplemented, if necessary, with the hydrogenated block copolymer (b) and the hydrogenated block copolymer (c) may be prepared and then mixed.

The coating method using a solution of the resin material can involve, but is not limited to, for example, dissolving the resin material in a solvent capable of dissolving the resin material, coating a substrate film with the solution using a coater or the like, and drying off the solvent by heating to produce the tacky film.

The coating method using a molten form of the resin material can involve, but is not limited to, for example, coating a substrate film with the molten resin material using a hot melt coater or the like to produce the tacky film. In this case, it is preferred to use various substrate films having a glass transition temperature, a melting point, or a softening point higher than the coating temperature.

The method using a film extruder can involve, but is not limited to, for example, joining together a tacky layer component containing the resin material and a component (e.g., a thermoplastic resin) capable of forming a substrate film as two flows, i.e., a fluid for tacky layer formation and a fluid for substrate film formation, within a die in a melt coextruder so that a single fluid is formed and extruded, and combining the tacky layer and the resin film layer to produce the tacky film.

The method using a film extruder is excellent in productivity because the resin material forming the tacky layer can also be produced by dry-blending each component for the tacky layer in advance. Particularly, extrusion molding tends to be excellent in the adhesion and adhesion strength of a prepared surface protecting film.

The tacky film of the present embodiment can be temporarily attached to the surface of an optical molding such as a light guide plate or a prism sheet, a synthetic resin plate, a metal plate, decorated plywood, a coated steel plate, various nameplates, or the like, and used as a protecting film for preventing scratches or dirt during the processing, conveyance, or storage of these adherends.

EXAMPLES

Hereinafter, the present embodiment will be specifically described with reference to Examples. However, the present embodiment is not limited by these Examples. In each of Examples and Comparative Examples, the preparation of a hydrogenated block copolymer, the production of a propylene resin composition, and the comparison of physical properties were performed by the methods described below. In this respect, the properties of the hydrogenated block copolymer and the physical properties of the propylene resin composition were measured as follows.

<Measurement Method>

1) Content of Each Polymer Block in Hydrogenated Block Copolymer

Approximately 20 mL of a polymer solution sampled in each step of a polymerization process for a pre-hydrogenated block copolymer was injected to a hermetically sealed 100 mL bottle containing 0.50 mL of n-propylbenzene and approximately 20 mL of toluene as internal standards to prepare a sample.

This sample was measured with a gas chromatograph (manufactured by Shimadzu Corporation; GC-14B) equipped with a packed column carrying Apiezon grease. The amount of residual monomers in the polymer solution was determined from calibration curves of butadiene monomers and styrene monomers obtained beforehand to confirm that the degrees of polymerization of butadiene monomers and styrene monomers were 100%. The content of each polymer block was calculated according to the expression given below.

The degree of polymerization of butadiene was measured at a constant temperature of 90° C., and the polymerization of styrene was performed under conditions involving holding at 90° C. for 10 minutes and temperature increase to 150° C. at a rate of 10° C./min.

Content of each block=(Total amount of monomers fed in each step)/(Amount of all monomers)× 100% by mass 2) Measurement of ΔV Value ($V_H$–$V_L$) of Vinyl Bond Content Before Hydrogenation of Polymer Block (B)

For the polymer block (B), the reaction time from the start of polymerization to the end of polymerization was divided into 6 equal parts to determine a first region to a sixth region. Conjugated diene compounds of the first region to the sixth region were sampled, and their vinyl bond contents were measured. When $V_H$ and $V_L$ represented the highest value and the lowest value, respectively, of the vinyl bond contents before hydrogenation of the polymer block (B), $V_H$–$V_L$ was defined as a ΔV value.

The "start of polymerization" for the polymer block (B) was the point at which the starting material monomer of the polymer block (B) was charged into the reactor, and the "end of polymerization" for the polymer block (B) was the point immediately before the starting material monomer of the polymer block (S) was charged into the reactor.

3) Vinyl Bond Content Before Hydrogenation of Hydrogenated Block Copolymer

Polymers sampled in each step of a polymerization process for a pre-hydrogenated block copolymer, and during polymerization for the polymer block (B) were measured by the proton nuclear magnetic resonance ($^1$H-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature: 26° C. The vinyl bond content was calculated from the ratios of 1,4-bonds and 1,2-bonds (for butadiene; instead, 3,4-bonds for isoprene) by calculating an integrated value of signals per 1H of each bond from an integrated value of signals attributed to 1,4-bonds and 1,2-bonds.

The vinyl bond content of each polymer sampled in each step of a polymerization process for a pre-hydrogenated block copolymer was calculated to calculate the respective vinyl bond contents of the block (C) and the block (B).

4) Degree of Hydrogenation of Unsaturated Bond Based on Conjugated Diene Compound Unit of Hydrogenated Block Copolymer Polymers after hydrogenation were measured by proton nuclear magnetic resonance ($^1$H-NMR). The measurement conditions and the method for processing measurement data were the same as in the paragraph 3). The degree of hydrogenation was determined by calculating integrated values of signals derived from remaining double bonds and signals derived from hydrogenated conjugated diene at 4.5 to 5.5 ppm, and calculating ratios thereof.

5) Butylene Content and/or Propylene Content Based on 100 Mol % in Total of Conjugated Diene Compound Unit The total amount of conjugated diene compound units in a hydrogenated block copolymer, and a butylene content and/or a propylene content were measured by proton nuclear magnetic resonance ($^1$H-NMR) using polymers after hydrogenation. The measurement conditions and the method for processing measurement data were the same as in the paragraphs 3) and 4). The butylene content was determined by calculating an integrated value of signals attributed to butylene (hydrogenated 1,2-bonds) at 0 to 2.0 ppm of the spectrum, and calculating a ratio thereof.

6) Content of Vinyl Aromatic Compound Unit (Hereinafter, Also Referred to as "Styrene Content") of Hydrogenated Block Copolymer Polymers after hydrogenation were measured by the proton nuclear magnetic resonance ($^1$H-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature: 26° C. The styrene content was calculated using an integrated value of all styrene aromatic signals at 6.2 to 7.5 ppm of the spectrum.

The content of all vinyl aromatic compounds (total styrene content) and the styrene content of the polymer block (S) were also confirmed by calculating the content of vinyl aromatic compound units in each polymer sampled in each step of a polymerization process for a pre-hydrogenated block copolymer.

7) DSC Measurement 10 mg of each hydrogenated block copolymer was precisely weighed into an aluminum pan. A differential scanning calorimeter (DSC) (manufactured by TA Instruments, Q2000) was used. The temperature was increased at a rate of temperature increase of 10° C./min from an initial temperature of −50° C. to 150° C. in a nitrogen atmosphere (flow rate: 50 mL/min), kept at 150° C. for 5 minutes, and then decreased to −50° C. at a rate of 10° C./min, followed by measurement. A crystallization peak appearing in the course of temperature decrease on the drawn DSC curve was regarded as a crystallization temperature (° C.), and the quantity of heat indicated by the crystallization peak area was regarded as the heat of crystallization (J/g).

8) Dynamic Viscoelasticity Measurement of Hydrogenated Block Copolymer

The dynamic viscoelastic spectrum was measured by the following method to obtain the peak height (maximum) of the loss tangent tan δ, a temperature providing the maximum peak height, and the width at half height of the peak.

First, a hydrogenated block copolymer was molded into a sheet having a thickness of 2 mm. Then, the sheet was cut into a width of 10 mm and a length of 35 mm to prepare a sample for measurement.

The sample for measurement was loaded in the torsion type geometry of an apparatus ARES (trade name, manufactured by TA Instruments) and measured under conditions involving an effective measurement length of 25 mm, a strain of 0.5%, a frequency of 1 Hz, a measurement range from −100° C. to 100° C., and a rate of temperature increase of 3° C./min.

9) Weight Average Molecular Weight of Hydrogenated Block Copolymer

The weight average molecular weight (Mw) and the number average molecular weight (Mn) of a hydrogenated block copolymer were determined by gel permeation chromatography (GPC) measurement. Specifically, these molecular weights were determined as molecular weights based on polystyrene using a measuring apparatus LC-10 manufactured by Shimadzu Corporation, columns TSKgel GMHXL (4.6 mm ID×30 cm, two columns), and a solvent tetrahydrofuran (THF) and using a commercially available standard polystyrene.

The total content of a high molecular weight component and a low molecular weight component based on their peak weight average molecular weights obtained as described above was defined as a value obtained by dividing the total peak area of the high molecular weight component and the low molecular weight component by the total area of peaks, and the total content value thereof was determined (total content of high and low molecular weight components).

The degree of coupling was determined using the molecular weight distribution (Mw/Mn) measured by the GPC and using a peak area before coupling and a peak area after coupling.

10) Melt Flow Rate (Hereinafter, Also Referred to as "MFR") of Hydrogenated Block Copolymer The MFR of a hydrogenated block copolymer and a propylene resin was measured at 230° C. under a load of 2.16 Kg in accordance with ISO 1133.

11) Dispersity of Hydrogenated Block Copolymer and Dispersity of Sheet-Shaped Molding Hydrogenated block copolymers (a-1) to (a-21) obtained in Examples 1 to 10 and Comparative Examples 1 to 11 were singly press-molded into a thickness of 2 mm at 200° C. The obtained sheet-shaped moldings, and 250 μm sheet-shaped moldings obtained in Examples 25 to 38 and Comparative Examples 23 to 38 were stained at their cross sections with ruthenium tetroxide. Then, ultrathin sections obtained therefrom using a microtome were observed under a transmission electron microscope (TEM) at a magnification of ×50000. A ratio of standard deviation to a mean area of polygons obtained by the Voronoi tessellation based on the centroids of the stained vinyl aromatic compound particles in the observed TEM image was calculated using image analysis software (manufactured by Asahi Kasei Engineering Corp., A-Zou Kun), and regarded as dispersity.

12) Shore A Hardness of Hydrogenated Block Copolymer

Hydrogenated block copolymers (a-1) to (a-21) obtained in Examples 1 to 10 and Comparative Examples 1 to 11 were singly press-molded into a thickness of 2 mm at 200° C. Four sheets each of the obtained sheet-shaped moldings were laminated, and the momentary value was measured using durometer type A in accordance with ASTM D-2240.

13) Blocking Resistance of Hydrogenated Block Copolymer

The blocking resistance of pellets of hydrogenated block copolymers (a-1) to (a-21) obtained in Examples 1 to 10 and Comparative Examples 1 to 11 was determined as follows: 60 g of the pellets of each hydrogenated block copolymer was transferred to a cylindrical metal container having a diameter of 6 cm and left standing at 60° C. for 24 hours under a load of 1160 g. Then, the pellets were taken out of the metal container and shaken. Then, the percentage of pellet weights of 3 or more consecutive pellets (blocking strength (%)) was measured and evaluated according to the following criteria:
  5: The blocking strength was less than 5%.
  4: The blocking strength was 5% or more and less than 10%.
  3: The blocking strength was 10% or more and less than 15%.
  2: The blocking strength was 15% or more and less than 20%.
  1: The blocking strength was 20% or more.

The pellets of hydrogenated block copolymers (a-1) to (a-21) used as described above were produced as follows: each of the hydrogenated block copolymers (a-1) to (a-21) was extruded into strands from a single-screw extruder (30 mmφ) set to 200° C., and the strands were cut in water using a rotating blade fitted in front of a die to obtain pellets, which were then mixed with a polyethylene powder (Acumist B4 manufactured by Honeywell) as a pellet blocking prevention agent at a blending ratio of pellets of hydrogenated block copolymers (a-1) to (a-21)/polyethylene powder=100/0.3 using a tumbler to obtain hydrogenated block copolymer pellets.

14) Hysteresis Loss at 300% Elongation of Hydrogenated Block Copolymer

Hydrogenated block copolymers (a-1) to (a-21) obtained in Examples 1 to 10 and Comparative Examples 1 to 11 were singly press-molded into a thickness of 2 mm at 200° C. The obtained sheet-shaped moldings were punched into JIS No. 5 dumbbell shapes. The resulting samples were elongated by 300% at a pulling rate of 500 mm/min using a tensile tester (Minebea Co., Ltd., Tg-5 kN) in accordance with JIS K6251 and brought back at a rate of 500 mm/min. When the tensile strength was 0 MPa, the percentage of residual elongation was regarded as the degree of hysteresis loss. The obtained degree of hysteresis loss (%) was evaluated according to the following criteria:
  5: The degree of hysteresis loss was less than 5%.
  4: The degree of hysteresis loss was 5% or more and less than 10%.
  3: The degree of hysteresis loss was 10% or more and less than 15%.
  2: The degree of hysteresis loss was 15% or more and less than 20%.
  1: The degree of hysteresis loss was 20% or more.

15) Solvent Resistance of Hydrogenated Block Copolymer

Pellets of hydrogenated block copolymers (a-1) to (a-21) obtained in Examples 1 to 10 and Comparative Examples 1 to 11 were used. The pellets of each hydrogenated block copolymer were dipped in toluene at 23° C. for 1 hour. The state of appearance (state of the pellet shape) of the pellets thus dipped was visually observed, and the solvent resistance was evaluated according to the following criteria:
  5: The pellets maintained the shape with the size unchanged.
  4: The pellets swelled slightly but maintained the shape.
  3: The pellets swelled and chipped.
  2: A portion of the pellets was left unmelted.
  1: The pellets dissolved completely.

16) Calculation of Bragg Plane Spacing and g-Factor

Hydrogenated block copolymers obtained in Examples 1 to 10 and Comparative Examples 1 to 11 were compression-molded to prepare sheets having a thickness of 2 mm. The obtained sheets were used in the following measurement.

The Bragg plane spacing of each hydrogenated block copolymer was measured using a nano-scale X ray structural evaluation apparatus NANO-Viewer [manufactured by Rigaku Corp.] and PILATUS 100K (two-dimensional semiconductor detector). For the measurement, 0.2 mmφ pinhole was used in the first slit, and 0.1 mmφ pinhole was used in the second slit. Each sheet prepared by the method described above was irradiated with incident X ray in the sheet surface normal direction, and transmitted scattered light was detected with PILATUS 100K. The obtained two-dimensional SAXS pattern was subjected to scatter correction for the background of the detector and empty cells, followed by circular averaging to determine a one-dimensional scatter profile. If necessary, the SAXS profile derived from the divergence of the incident X ray beam was desmeared. The primary peak position (2θm) of scatter derived from a microphase separated structure was read from the one-dimensional scatter profile, and interdomain distance d, i.e., Bragg plane spacing, was calculated according to the Bragg equation (1):

$$d = \lambda/2/\sin(\theta m) \quad (1)$$

(θm: Bragg angle at the primary peak position of scatter, λ: incident X ray wavelength)

Also, the g-factor was calculated as follows.

Assuming a microphase separated structure model in which a spherical structure took a body-centered cubic lattice structure having secondary structural disorder (having a paracrystalline structure), fitting analysis was conducted on the SAXS profile described above using the theoretical scattering equation of this model. The theoretical scattering equation used was the equation described in Hideki Matsuoka, Hideaki Tanaka, Takeji Hashimoto, Norio Ise, Physical Review B, vol. 36, number 3 (1987) 1754. The g-factor was adjusted such that the fitting curve agreed with the SAXS profile of each sample, to calculate the g-factor of each sample. The g-factor is obtained by dividing the standard deviation from the mean of Bragg plane spacing by d.

17-1) Transparency of Sheet-Shaped Molding

Sheet-shaped moldings of 200 μm in thickness obtained in Examples 11 to 24 and Comparative Examples 12 to 22 were used. The haze value (%) was measured using a haze meter (manufactured by Nippon Denshoku Industries, Co., Ltd., NDH-1001DP) and used as an index for transparency. The obtained haze value was used in evaluation based on the criteria given below.

The sheet-shaped moldings of 200 μm in thickness were evaluated according to the following criteria:
5: The haze value was less than 3%.
4: The haze value was 3% or more and less than 8%.
3: The haze value was 8% or more and less than 13%.
2: The haze value was 13% or more and less than 20%.
1: The haze value was 20% or more.

17-2) Transparency of Sheet-Shaped Molding

Sheet-shaped moldings of 250 μm in thickness obtained in Examples 25 to 38 and Comparative Examples 23 to 38 were used. The haze value (%) was measured using a haze meter (manufactured by Nippon Denshoku Industries, Co., Ltd., NDH-1001DP) and used as an index for transparency. The obtained haze value was used in evaluation based on the criteria given below.

The sheet-shaped moldings of 250 μm in thickness were evaluated according to the following criteria:
5: The haze value was less than 5%.
4: The haze value was 5% or more and less than 10%.
3: The haze value was 10% or more and less than 15%.
2: The haze value was 15% or more and less than 20%.
1: The haze value was 20% or more.

18) Flexibility of Sheet-Shaped Molding

Sheet-shaped moldings of 200 μm in thickness obtained in Examples 11 to 24 and Comparative Examples 12 to 22, and sheet-shaped moldings of 250 μm in thickness obtained in Examples 25 to 38 and Comparative Examples 23 to 38 were used. These moldings were punched into JIS No. 5 dumbbell shapes, and the tensile modulus (MPa) in the machine direction (MD) of each of the resulting samples was measured at a pulling rate of 200 mm/min using a tensile tester (Minebea Co., Ltd., Tg-5 kN) in accordance with JIS K6251 and used as an index for flexibility. The obtained tensile modulus was evaluated according to the following criteria:
5: The tensile modulus was lower than 250 MPa.
4: The tensile modulus was 250 MPa or higher and lower than 300 MPa.
3: The tensile modulus was 300 MPa or higher and lower than 350 MPa.
2: The tensile modulus was 350 MPa or higher and lower than 400 MPa.
1: The tensile modulus was 400 MPa or higher.

19) Anisotropy of Sheet-Shaped Molding

Sheet-shaped moldings of 250 μm in thickness obtained in Examples 25 to 38 and Comparative Examples 23 to 38 were used. These moldings were punched into JIS No. 5 dumbbell shapes, and the tensile modulus (MPa) in the machine direction (MD) and in the transverse direction (TD) of each of the resulting samples was measured at a pulling rate of 200 mm/min using a tensile tester (Minebea Co., Ltd., Tg-5 kN) in accordance with JIS K6251. The obtained tensile modulus MD/TD ratio was evaluated according to the following criteria:
5: The MD/TD value was in the range of 0.95 to 1.05.
4: The MD/TD value was in the range of 0.92 to 1.08 (except for the range of 5 described above).
3: The MD/TD value was in the range of 0.89 to 1.11 (except for the ranges of 5 and 4 described above).
2: The MD/TD value was in the range of 0.85 to 1.15 (except for the ranges of 5, 4, and 3 described above).
1: The MD/TD value was less than 0.85 or more than 1.15.

20) Workability of Sheet-Shaped Molding

The state of appearance of each of sheet-shaped moldings obtained by the method described in (Production of sheet-shaped molding) mentioned later under the blending conditions described in Examples 11 to 24 and Comparative Examples 12 to 24 and under varying temperature conditions was visually observed to confirm a temperature region in which the state of appearance was good (i.e., free from die lines, wrinkles, and wave patterns). The processability was evaluated according to the following criteria:
5: 150° C. to 200° C. (50° C.)
4: 160° C. to 200° C. (40° C.)
3: 170° C. to 200° C. (30° C.)
2: 180° C. to 200° C. (20° C.)
1: 190° C. to 200° C. (10° C.)

21) Surface Smoothness of Sheet-Shaped Molding

Sheet-shaped moldings of 200 μm in thickness obtained in Examples 11 to 24 and Comparative Examples 12 to 24, and sheet-shaped moldings of 250 μm in thickness obtained in Examples 25 to 38 and Comparative Examples 23 to 38 were used. The surface roughness (10-point average roughness: Rz) of each sheet was measured under a laser microscope (manufactured by Keyence Corp.; VK-X8500). The obtained value was evaluated according to the following criteria:
5: The Rz value was less than 20 μm.
4: The Rz value was 20 μm or more and less than 30 μm.
3: The Rz value was 30 μm or more and less than 40 μm.
2: The Rz value was 40 μm or more and less than 50 μm.
1: The Rz value was 50 μm or more.

22) Low Stickiness of Sheet-Shaped Molding

Sheet-shaped moldings of 200 μm in thickness obtained in Examples 11 to 24 and Comparative Examples 12 to 24, and sheet-shaped moldings of 250 μm in thickness obtained in Examples 25 to 38 and Comparative Examples 23 to 38 were each cut into 5 cm×8 cm and 4 cm×6 cm test specimens. Two sheets of the obtained test specimens were laminated (upper: 5 cm×8 cm, lower: 4 cm×5 cm). Then, a load of 500 g (size: 6 cm×10 cm×1 cm) was placed on the upper sheet and left standing for 60 seconds. When the sheets were then detached 180° at a rate of 100 mm/min, the tack strength (N) was measured using a tensile tester (Minebea Co., Ltd., Tg-5 kN) and used as an index for low stickiness. The obtained tack strength was evaluated according to the following criteria:

5: The tack strength was smaller than 3 N.
4: The tack strength was 3 N or larger and smaller than 5 N.
3: The tack strength was 5 N or larger and smaller than 10 N.
2: The tack strength was 10 N or larger and smaller than 15 N.
1: The tack strength was 15 N or larger.

23) Wide angle X ray diffractometry of polypropylene resin composition

250 μm sheet-shaped moldings obtained in Examples 25 to 38 and Comparative Examples 23 to 38 were used as test specimens. A nano-scale X ray structural evaluation apparatus NANO-Viewer manufactured by Rigaku Corp. was used, and the optical system employed X ray (wavelength: 0.154 nm) parallelized using point collimation (first slit: 0.4 mmϕ, second slit: 0.2 mmϕ, guard slit: 0.8 mmϕ). Each molding was irradiated with incident X ray (edge incident) parallel to the molding surface from the side. In this respect, the sample thickness in the X ray incident direction was equal to or smaller than the sheet thickness. The detector used was an imaging plate. The camera length was set to 74.5 mm, and the exposure time was set to 15 minutes. In order to prevent air-derived scatter, the passage from the second slit through the detector was vacuumized. Scatter correction was performed for empty cells and the background of the apparatus. The obtained two-dimensional scatter pattern was averaged in a fan-like fashion within the range of $-15°<\chi<15°$ ($\chi$: azimuth defined with the thickness direction of the molding as 0°) to obtain a one-dimensional scatter profile. The line connecting scattering intensity at $2\theta=5°$ and scattering intensity at $2\theta=30°$ in the obtained scatter profile was used as a baseline. Intensity at scattering peak top present at $2\theta=14°$ (scattered by the (110) plane of the α crystals of the polypropylene resin) from the baseline was defined as I14, and scattering intensity at $2\theta=15°$ from the baseline was defined as I15. The intensity ratio thereof (I14/I15) was calculated.

24) CFC Measurement of Molding of Resin Composition

250 μm sheet-shaped moldings obtained in Examples 25 to 38 and Comparative Examples 23 to 38 were used as test samples. An elution temperature-elution volume curve was measured by temperature rising elution fractionation as described below, and an elution volume at each temperature, an integral elution volume, and the molecular weight distribution of an eluted component were determined.

First, the temperature of a column containing a packing material was increased to 145° C. A sample solution containing a hydrogenated block copolymer dissolved in o-dichlorobenzene was introduced to the column, which was then kept at 140° C. for 30 minutes. Next, the temperature of the column was decreased to −20° C. at a rate of temperature decrease of 1° C./min and then kept for 60 minutes to deposit the sample on the packing material surface.

Then, the temperature of the column was sequentially increased at 5° C. intervals at a rate of temperature increase of 40° C./min. The concentration of a sample eluted at each temperature was detected. Then, the elution temperature-elution volume curve was measured from the elution volumes (% by mass) of the samples and the corresponding intracolumn temperatures (° C.). The elution volume at each temperature and the molecular weight distribution were determined.

Apparatus: CFC type cross fractionation chromatograph (manufactured by Polymer Characterization, S.A.)
Detector: IR type infrared spectrophotometer (manufactured by Polymer Characterization, S.A.)
Detection wavelength: 3.42 μm
Column: Shodex HT-806M×3 (manufactured by Showa Denko K.K.)
Column calibration: monodisperse polystyrene (manufactured by Tosho Corp.)
Molecular weight calibration method: calibration method using standards (based on polystyrene)
Eluent: o-dichlorobenzene
Flow rate: 1.0 mL/min
Sample concentration: 120 mg/30 mL
Injection volume: 0.5 mL An integral elution volume (%) in the total volume at −20° C. or lower, an integral elution volume (%) in the total volume in the range of higher than −20° C. and lower than 60° C., an integral elution volume (%) in the total volume in the range of 60° C. or higher and 150° C. or lower, and the molecular weight distribution of an eluted component from 10 to 60° C. were determined from the obtained elution temperature-elution volume curve.

[Tack Property of Film]

25) Evaluation of Initial Tack Strength

The measuring apparatus used was a universal tensile compression tester "Technograph TGE-500N; manufactured by Minebea Co., Ltd.".

In each of Examples 39 to 59 and Comparative Examples 39 to 53 described below, a 25 mm wide sample of a prepared surface protecting film was laminated with each of a PMMA plate (arithmetic average roughness of surface: 0.1 μm) and a SUS304HL plate, and attached thereto by moving thereon a rubber roll (diameter: 10 cm) having a weight of 2 kg. The resulting sample was left at a temperature of 23° C. and 50% relative humidity for 30 minutes. Then, the sample was peeled 180° from the plate at a peel speed of 300 mm/min. The initial tack strength was measured in accordance with JIS K6854-2 and evaluated as described below.

For the PMMA plate, tack strength of 400 (g/25 mm) or larger was assessed as ○; tack strength of 200 (g/25 mm) or larger and smaller than 400 (g/25 mm) was assessed as Δ; and tack strength of smaller than 200 (g/25 mm) was assessed as ×.

26) Evaluation of Tack Increasing Property

In each of Examples 39 to 59 and Comparative Examples 39 to 53 described below, a 25 mm wide sample of a prepared surface protecting film was laminated with a PMMA plate (arithmetic average roughness of surface: 0.1 μm), and attached thereto by moving thereon a rubber roll (diameter: 10 cm) having a weight of 2 kg. Then, the resulting sample was stored in an oven having a temperature of 80° C. for 1 hour and then left at 23° C. and 50% relative humidity for 30 minutes. Then, the sample was peeled with an angle of 180° from the plate at a peel speed of 300 mm/min. The tack strength was measured in accordance with JIS K6854-2.

The tack increasing properties were evaluated according to the following expression:

Tack increasing properties=(Tack strength after heating at 80° C. for 1 hour)/(Initial tack strength)

Smaller tack increasing properties were better. A value of 1.7 or smaller was assessed as ○; a value of larger than 1.7 and 2 or smaller was assessed as Δ; and a value of larger than 2 was assessed as ×.

27) Evaluation of Followability to Irregularities

The followability to irregularities was determined from the numerical values of initial tack strength described above according to the following expression:

Followability to irregularities=(Initial tack strength for the PMMA plate)/(Initial tack strength for SUS304HL)

Followability to irregularities of 3 or less was assessed as ◯; followability of more than 3 and 5 or less was assessed as Δ; and followability of more than 5 was assessed as ×.

<Production of Hydrogenated Block Copolymer>

Example 1

(Preparation of Hydrogenation Catalyst)

A hydrogenation catalyst used in hydrogenation reaction for a hydrogenated block copolymer was prepared by the following method: 1 L of dried and purified cyclohexane was charged into a reactor purged with nitrogen. To the reactor, 100 mmol of bis(η5-cyclopentadienyl) titanium dichloride was added, and a n-hexane solution containing 200 mmol of trimethyl aluminum was added with thorough stirring. The mixture was reacted at room temperature for 3 days.

(Preparation of Hydrogenated Block Copolymer)

<Hydrogenated Block Copolymer (a)>

Batch polymerization was performed using a tank reactor (internal volume: 10 L) equipped with a stirring device and a jacket. 1 L of cyclohexane was charged into the reactor. Then, 0.050 parts by mass of n-butyl lithium (hereinafter, also referred to as "Bu—Li") based on 100 parts by mass in total of monomers, and 0.05 mol of N,N,N',N'-tetramethylethylenediamine (hereinafter, also referred to as "TMEDA") as a vinylating agent based on 1 mol of Bu—Li were added to the reactor. In step 1, a cyclohexane solution (concentration: 20% by mass) containing 10 parts by mass of butadiene was charged into the reactor over 10 minutes, followed by polymerization for 10 minutes. The polymerization temperature was controlled to 65° C. In step 2, 1.50 mol of TMEDA based on 1 mol of Bu—Li and 0.05 mol of sodium t-pentoxide (hereinafter, referred to as NaOAm) based on 1 mol of Bu—Li were added to the reactor, and a cyclohexane solution (concentration: 20% by mass) containing 85 parts by mass of butadiene was charged into the reactor over 60 minutes, followed by polymerization for 10 minutes. The polymerization temperature was controlled to 60° C. In step 3, a cyclohexane solution (concentration: 20% by mass) containing 5 parts by mass of styrene was charged into the reactor over 5 minutes, followed by polymerization for 10 minutes. The polymerization temperature was controlled to 65° C.

Each obtained polymer was sampled in each step of the block copolymer preparation process. The analytical values of the obtained block copolymer were a styrene content of 5% by mass, a weight average molecular weight of 249,000, a molecular weight distribution of 1.12, and a Δ vinyl bond content: $(V_H-V_L)$ of 3.5 mol % in the butadiene block (B) in step 2.

Next, to the obtained block copolymer, the hydrogenation catalyst was added at 100 ppm (in terms of titanium) based on 100 parts by mass of the block copolymer, followed by hydrogenation reaction at a temperature of 70° C. at a hydrogen pressure of 0.7 MPa. After subsequent addition of methanol, 0.3 parts by mass of octadecyl-3-(3,5-di-t-butyl-4-hydroxyphenyl)propionate were added as a stabilizer to the block copolymer. The obtained hydrogenated block copolymer (a-1) had a degree of hydrogenation of 99.5% and MFR of 2 g/10 minutes. The results of analyzing the obtained hydrogenated block copolymer (a-1) are shown in Table 1.

Example 2

A hydrogenated block copolymer (a-2) was produced by the same operation as in (a-1) except that: 0.050 parts by mass of Bu—Li were used; in step 1, 10 parts by mass of butadiene were used; in step 2, 82 parts by mass of butadiene were used; in step 3, 5 parts by mass of styrene were used; and in additional step 4, a cyclohexane solution (concentration: 20% by mass) containing 3 parts by mass of butadiene was charged into the reactor over 5 minutes, followed by polymerization for 10 minutes, and the polymerization temperature was controlled to 65° C. to produce a block copolymer. The obtained hydrogenated block copolymer (a-2) had a styrene content of 5% by mass, a weight average molecular weight of 251,000, a molecular weight distribution of 1.14, a degree of hydrogenation of 99.8%, and MFR of 4 g/10 minutes. The results of analyzing the obtained hydrogenated block copolymer (a-2) are shown in Table 1.

Example 3

A hydrogenated block copolymer (a-3) was produced by the same operation as in (a-1) except that: 0.060 parts by mass of Bu—Li were used; in step 1, 15 parts by mass of butadiene were used; in step 2, 78 parts by mass of butadiene were used; and in step 3, 7 parts by mass of styrene were used to produce a block copolymer. The obtained hydrogenated block copolymer (a-3) had a styrene content of 7% by mass, a weight average molecular weight of 204,000, a molecular weight distribution of 1.19, a degree of hydrogenation of 99.6%, and MFR of 2.9 g/10 minutes. The results of analyzing the obtained hydrogenated block copolymer (a-3) are shown in Table 1.

Example 4

A hydrogenated block copolymer (a-4) was produced by the same operation as in (a-1) except that: 0.053 parts by mass of Bu—Li were used; in step 1, 3 parts by mass of butadiene were used; in step 2, 85 parts by mass of butadiene were used; and in step 3, 12 parts by mass of styrene were used to produce a block copolymer. The obtained hydrogenated block copolymer (a-4) had a styrene content of 12% by mass, a weight average molecular weight of 225,000, a molecular weight distribution of 1.22, a degree of hydrogenation of 99.3%, and MFR of 1.9 g/10 minutes. The results of analyzing the obtained hydrogenated block copolymer (a-4) are shown in Table 1.

Example 5

A hydrogenated block copolymer (a-5) was produced by the same operation as in (a-1) except that: 0.042 parts by mass of Bu—Li were used; in step 1, 6 parts by mass of butadiene were used; in step 2, 91 parts by mass of butadiene were used; and in step 3, 3 parts by mass of styrene were used to produce a block copolymer. The obtained hydrogenated block copolymer (a-5) had a styrene content of 3% by mass, a weight average molecular weight of 282,000, a molecular weight distribution of 1.29, a degree of hydrogenation of 98.6%, and MFR of 3.9 g/10 minutes. The results of analyzing the obtained hydrogenated block copolymer (a-5) are shown in Table 1.

Example 6

A hydrogenated block copolymer (a-6) was produced by the same operation as in (a-1) except that: 0.078 parts by mass of Bu—Li were used; in step 1, 16 parts by mass of butadiene were used; in step 2, 72 parts by mass of butadiene were used; and in step 3, 12 parts by mass of styrene were used to produce a block copolymer. The obtained hydrogenated block copolymer (a-6) had a styrene content of 12% by mass, a weight average molecular weight of 161,000, a molecular weight distribution of 1.12, a Δ vinyl bond content: $(V_H-V_L)$ of 3.3 mol % in the butadiene block (B) in step 2, a degree of hydrogenation of 99.0%, and MFR of 1.5 g/10 minutes. The results of analyzing the obtained hydrogenated block copolymer (a-6) are shown in Table 1.

Example 7

A hydrogenated block copolymer (a-18) was produced by the same operation as in (a-1) except that: 0.062 parts by mass of Bu—Li were used; in step 1, 7 parts by mass of butadiene were used; in step 2, 78 parts by mass of butadiene were used; and in step 3, 15 parts by mass of styrene were used to produce a block copolymer. The obtained hydrogenated block copolymer (a-18) had a styrene content of 15% by mass, a weight average molecular weight of 198,000, a molecular weight distribution of 1.29, a degree of hydrogenation of 99.4%, and MFR of 2.9 g/10 minutes. The results of analyzing the obtained hydrogenated block copolymer (a-18) are shown in Table 1.

Example 8

A hydrogenated block copolymer (a-19) was produced by the same operation as in (a-1) except that: 0.050 parts by mass of Bu—Li were used; before step 1, 0.03 mol of TMEDA was used; in step 1, 10 parts by mass of butadiene were used; in step 2, 85 parts by mass of butadiene were charged into the reactor over 60 minutes, followed by polymerization for 10 minutes, and the polymerization temperature started at 45° C. and was controlled to 66° C. over 60 minutes, i.e., the difference in polymerization temperature in step 2 was 21° C.; and in step 3, 5 parts by mass of styrene were used to produce a block copolymer. The obtained hydrogenated block copolymer (a-19) had a styrene content of 5% by mass, a weight average molecular weight of 248,000, a molecular weight distribution of 1.28, a Δ vinyl bond content: $(V_H-V_L)$ of 10.2 mol % in the butadiene block (B) in step 2, a degree of hydrogenation of 98.5%, and MFR of 3.2 g/10 minutes. The results of analyzing the obtained hydrogenated block copolymer (a-19) are shown in Table 1.

Example 9

A hydrogenated block copolymer (a-20) was produced by the same operation as in (a-1) except that the hydrogenation reaction of the block copolymer was stopped in midstream. The obtained hydrogenated block copolymer (a-20) had a styrene content of 5% by mass, a weight average molecular weight of 251,000, a molecular weight distribution of 1.13, a degree of hydrogenation of 85.0%, and MFR of 3.2 g/10 minutes. The results of analyzing the obtained hydrogenated block copolymer (a-20) are shown in Table 1.

Example 10

A hydrogenated block copolymer (a-21) was produced by the same operation as in (a-1) except that: 0.058 parts by mass of Bu—Li were used; before step 1, 0.04 mol of TMEDA was used; in step 1, 5 parts by mass of butadiene were used; before step 2, 1.15 mol of TMEDA was used, and NaOAm was not added; in step 2, 77 parts by mass of isoprene were used; in step 3, 15 parts by mass of styrene were used; and the hydrogenation catalyst for the hydrogenation reaction of the obtained block copolymer was changed to nickel 2-ethyl-hexanoate/lithium hydride, which was added at 100 ppm (in terms of nickel) based on 100 parts by mass of the block copolymer, and the hydrogenation reaction was performed at a temperature of 90° C. at a hydrogen pressure of 4.5 MPa to produce a block copolymer. The obtained hydrogenated block copolymer (a-21) had a styrene content of 15% by mass, a weight average molecular weight of 206,000, a molecular weight distribution of 1.14, a degree of hydrogenation of 91.2%, and MFR of 2.2 g/10 minutes. The results of analyzing the obtained hydrogenated block copolymer (a-21) are shown in Table 1.

Comparative Example 1

A hydrogenated block copolymer (a-7) was produced by the same operation as in (a-1) except that: 0.099 parts by mass of Bu—Li were used; in step 1, 17 parts by mass of butadiene were used; in step 2, 67 parts by mass of butadiene were used; and in step 3, 16 parts by mass of styrene were used to produce a block copolymer. The obtained hydrogenated block copolymer (a-7) had a styrene content of 16% by mass, a weight average molecular weight of 117,000, a molecular weight distribution of 1.09, a degree of hydrogenation of 99.2%, and MFR of 1.8 g/10 minutes. The results of analyzing the obtained hydrogenated block copolymer (a-7) are shown in Table 1.

Comparative Example 2

A hydrogenated block copolymer (a-8) was produced by the same operation as in (a-1) except that: 0.050 parts by mass of Bu—Li were used; in step 1, 20 parts by mass of butadiene were used; and in step 2, 80 parts by mass of butadiene were used to produce a block copolymer. The obtained hydrogenated block copolymer (a-8) had a styrene content of 0% by mass, a weight average molecular weight of 250,000, a molecular weight distribution of 1.08, a degree of hydrogenation of 99.5%, and MFR of 32 g/10 minutes. The results of analyzing the obtained hydrogenated block copolymer (a-8) are shown in Table 1.

Comparative Example 3

A hydrogenated block copolymer (a-9) was produced by the same operation as in (a-1) except that: 0.122 parts by mass of Bu—Li were used; in step 1, 5 parts by mass of butadiene were used; in step 2, 70 parts by mass of butadiene were used; and in step 3, 25 parts by mass of styrene were used to produce a block copolymer. The obtained hydrogenated block copolymer (a-9) had a styrene content of 25% by mass, a weight average molecular weight of 88,000, a molecular weight distribution of 1.11, a degree of hydrogenation of 99.0%, and MFR of 3.1 g/10 minutes. The results of analyzing the obtained hydrogenated block copolymer (a-9) are shown in Table 1.

Comparative Example 4

A hydrogenated block copolymer (a-10) was produced by the same operation as in (a-1) except that: 0.072 parts by mass of Bu—Li were used; in step 1, 35 parts by mass of butadiene were used; in step 2, 63 parts by mass of butadiene were used; and in step 3, 2 parts by mass of styrene were used to produce a block copolymer. The obtained hydrogenated block copolymer (a-10) had a styrene content of 2% by mass, a weight average molecular weight of 169,000, a molecular weight distribution of 1.12, a degree of hydrogenation of 98.3%, and MFR of 4.8 g/10 minutes. The results of analyzing the obtained hydrogenated block copolymer (a-10) are shown in Table 1.

Comparative Example 5

A hydrogenated block copolymer (a-11) was produced by the same operation as in (a-1) except that: 0.065 parts by mass of Bu—Li were used; in step 1, 8 parts by mass of styrene were used; in step 2, 85 parts by mass of butadiene were used; and in step 3, 7 parts by mass of styrene were used to produce a block copolymer. The obtained hydrogenated block copolymer (a-11) had a styrene content of 15% by mass, a weight average molecular weight of 178,000, a molecular weight distribution of 1.12, a degree of hydrogenation of 99.2%, and MFR of 4.8 g/10 minutes. The results of analyzing the obtained hydrogenated block copolymer (a-11) are shown in Table 1.

Comparative Example 6

A hydrogenated block copolymer (a-12) was produced by the same operation as in (a-1) except that: 0.050 parts by mass of Bu—Li were used; before step 1, 0.250 mol of TMEDA was used; in step 1, 10 parts by mass of butadiene were used; in step 2, 85 parts by mass of butadiene were used; and in step 3, 5 parts by mass of styrene were used to produce a block copolymer. The obtained hydrogenated block copolymer (a-12) had a styrene content of 5% by mass, a weight average molecular weight of 248,000, a molecular weight distribution of 1.16, a $\Delta$ vinyl bond content: ($V_H$–$V_L$) of 4.2 mol % in the butadiene block (B) in step 2, a degree of hydrogenation of 99.1%, and MFR of 9.2 g/10 minutes. The results of analyzing the obtained hydrogenated block copolymer (a-12) are shown in Table 1.

Comparative Example 7

Polymerization was performed by the same operation as in (a-1) to produce a block copolymer. Then, a hydrogenated block copolymer (a-13) having a controlled degree of hydrogenation was produced. The obtained hydrogenated block copolymer (a-13) had a styrene content of 5% by mass, a weight average molecular weight of 253,000, a molecular weight distribution of 1.15, a degree of hydrogenation of 70.0%, and MFR of 15.2 g/10 minutes. The results of analyzing the obtained hydrogenated block copolymer (a-13) are shown in Table 1.

Comparative Example 8

A hydrogenated block copolymer (a-14) was produced by the same operation as in (a-1) except that: 0.055 parts by mass of Bu—Li were used; and before step 2, 0.65 mol of TMEDA was used, and NaOAm was not added to produce a block copolymer. The obtained hydrogenated block copolymer (a-14) had a styrene content of 5% by mass, a weight average molecular weight of 239,000, a molecular weight distribution of 1.08, a $\Delta$ vinyl bond content: ($V_H$–$V_L$) of 3.8 mol % in the butadiene block (B) in step 2, a degree of hydrogenation of 99.4%, and MFR of 2.9 g/10 minutes. The results of analyzing the obtained hydrogenated block copolymer (a-14) are shown in Table 1.

Comparative Example 9

A hydrogenated block copolymer (a-15) was produced by the same operation as in (a-1) except that: 0.060 parts by mass of Bu—Li were used; in step 1, 10 parts by mass of butadiene were used; in step 2, 45 parts by mass of butadiene and 40 parts by mass of styrene were used; and in step 3, 5 parts by mass of styrene were used to produce a block copolymer. The obtained hydrogenated block copolymer (a-15) had a styrene content of 45% by mass, a weight average molecular weight of 141,000, a molecular weight distribution of 1.27, a degree of hydrogenation of 99.9%, and MFR of 7.8 g/10 minutes. The results of analyzing the obtained hydrogenated block copolymer (a-15) are shown in Table 1.

Comparative Example 10

(Adiabatic Polymerization)

1 L of cyclohexane was charged into the reactor, which was controlled to 30° C. 0.050 parts by mass of Bu-Li and 0.05 mol of TMEDA were charged into the reactor. In step 1, a cyclohexane solution (concentration: 20% by mass) containing 10 parts by mass of butadiene was charged in one portion into the reactor, followed by polymerization for 30 minutes. The polymerization temperature reached 60° C. Next, the internal temperature of the reactor was lowered to 10° C. over 30 minutes. In step 2, 1.80 mol of TMEDA based on 1 mol of Bu—Li was added, and a cyclohexane solution (concentration: 20% by mass) containing 85 parts by mass of butadiene were charged in one portion into the reactor, followed by polymerization for 60 minutes. The polymerization temperature reached 70° C. In short, the difference in polymerization temperature in step 2 was 60° C. In step 3, a cyclohexane solution (concentration: 20% by mass) containing 5 parts by mass of styrene was charged in one portion into the reactor, followed by polymerization for 30 minutes. The polymerization temperature reached 75° C.

Each obtained polymer was sampled in each step of the block copolymer preparation process. The analytical values of the obtained block copolymer were a styrene content of 5% by mass, a weight average molecular weight of 253,000, a molecular weight distribution of 1.31, and a $\Delta$ vinyl bond content: ($V_H$–$V_L$) of 18.4 mol % in the butadiene block (B) in step 2.

Next, to the obtained block copolymer, the hydrogenation catalyst was added at 100 ppm (in terms of titanium) based on 100 parts by mass of the block copolymer, followed by hydrogenation reaction at a temperature of 70° C. at a hydrogen pressure of 0.7 MPa. After subsequent addition of methanol, 0.3 parts by mass of octadecyl-3-(3,5-di-t-butyl-4-hydroxyphenyl)propionate were added as a stabilizer to the block copolymer. The obtained hydrogenated block copolymer (a-16) had a degree of hydrogenation of 98.5% and MFR of 4.7 g/10 minutes. The results of analyzing the obtained hydrogenated block copolymer (a-16) are shown in Table 1.

Comparative Example 11

(Adiabatic Polymerization)

A hydrogenated block copolymer (a-17) was produced by the same operation as in (a-16) except that: 0.110 parts by mass of Bu—Li were used; in step 1, 16 parts by mass of butadiene were used; in step 2, 66 parts by mass of butadiene were used; and in step 3, 18 parts by mass of styrene were used to produce a block copolymer. The obtained hydrogenated block copolymer (a-17) had a styrene content of 18% by mass, a weight average molecular weight of 102,000, a molecular weight distribution of 1.35, a Δ vinyl bond content: $(V_H - V_L)$ of 16.3 mol % in the butadiene block (B) in step 2, a degree of hydrogenation of 97.5%, and MFR of 3.8 g/10 minutes. The results of analyzing the obtained hydrogenated block copolymer (a-17) are shown in Table 1.

The results of analyzing the hydrogenated block copolymers (a-1) to (a-21) obtained as described above are shown in Table 1.

TABLE 1

| | | | Structural composition (% by mass) (in order of polymerizing) | | | | | | Vinyl bond content before hydrogenation (mol %) | | | Butylene/propylene content |
|---|---|---|---|---|---|---|---|---|---|---|---|---|
| | | Structure | (S) | (C) | (B) | (S) | (B1) | (C + S) | (C) | (B) | (B1) | (mol %) |
| Example 1 | a-1 | C-B-S | 0 | 10 | 85 | 5 | 0 | 15 | 15 | 78 | 0 | 71 |
| Example 2 | a-2 | C-B-S-B1 | 0 | 10 | 82 | 5 | 3 | 15 | 13 | 75 | 74 | 68 |
| Example 3 | a-3 | C-B-S | 0 | 15 | 78 | 7 | 0 | 22 | 18 | 82 | 0 | 72 |
| Example 4 | a-4 | C-B-S | 0 | 3 | 85 | 12 | 0 | 15 | 10 | 77 | 0 | 75 |
| Example 5 | a-5 | C-B-S | 0 | 6 | 91 | 3 | 0 | 9 | 11 | 70 | 0 | 66 |
| Example 6 | a-6 | C-B-S | 0 | 16 | 72 | 12 | 0 | 28 | 18 | 83 | 0 | 71 |
| Example 7 | a-18 | C-B-S | 0 | 7 | 78 | 15 | 0 | 22 | 14 | 78 | 0 | 73 |
| Example 8 | a-19 | C-B-S | 0 | 10 | 85 | 5 | 0 | 15 | 10 | 72 | 0 | 65 |
| Example 9 | a-20 | C-B-S | 0 | 10 | 85 | 5 | 0 | 15 | 15 | 78 | 0 | 71 |
| Example 10 | a-21 | C-B-S | 0 | 10 | 75 | 15 | 0 | 25 | 13 | 77 | 0 | 69 |
| Comparative Example 1 | a-7 | C-B-S | 0 | 17 | 67 | 16 | 0 | 33 | 13 | 77 | 0 | 64 |
| Comparative Example 2 | a-8 | C-B | 0 | 20 | 80 | 0 | 0 | 20 | 17 | 80 | 0 | 67 |
| Comparative Example 3 | a-9 | C-B-S | 0 | 5 | 70 | 25 | 0 | 30 | 15 | 78 | 0 | 74 |
| Comparative Example 4 | a-10 | C-B-S | 0 | 35 | 63 | 2 | 0 | 37 | 15 | 77 | 0 | 55 |
| Comparative Example 5 | a-11 | S-B-S | 8 | 0 | 85 | 7 | 0 | 15 | 0 | 78 | 0 | 78 |
| Comparative Example 6 | a-12 | C-B-S | 0 | 10 | 85 | 5 | 0 | 15 | 35 | 78 | 0 | 73 |
| Comparative Example 7 | a-13 | C-B-S | 0 | 10 | 85 | 5 | 0 | 15 | 15 | 80 | 0 | 69 |
| Comparative Example 8 | a-14 | C-B-S | 0 | 10 | 85 | 5 | 0 | 15 | 15 | 50 | 0 | 46 |
| Comparative Example 9 | a-15 | C-B/S-S | 0 | 10 | (45/40)* | 5 | 0 | 15 | 15 | 65 | 0 | 55 |
| Comparative Example 10 | a-16 | C-B-S | 0 | 10 | 85 | 5 | 0 | 15 | 15 | 70 | 0 | 64 |
| Comparative Example 11 | a-17 | C-B-S | 0 | 16 | 66 | 18 | 0 | 34 | 15 | 72 | 0 | 61 |

| | Degree of hydrogenation (mol %) | Tanδ | | | DSC measurement | | Hardness Shore A | Total content of high and low molecular weight components (%) | g-factor | Dispersity | Bragg plane spacing (nm) |
|---|---|---|---|---|---|---|---|---|---|---|---|
| | | Peak °C. | Height °C. | Width at half height °C. | Temperature °C. | Heat J/g | | | | | |
| Example 1 | 99.5 | −27.0 | 1.82 | 15.7 | 36.0 | 3.5 | 45 | 9.6 | 0.15 | 0.334 | 38 |
| Example 2 | 99.8 | −29.0 | 1.95 | 13.5 | 35.0 | 3.7 | 38 | 10.4 | 0.17 | 0.321 | 32 |
| Example 3 | 99.6 | −24.5 | 1.25 | 17.1 | 44.0 | 4.8 | 53 | 10.2 | 0.14 | 0.349 | 35 |
| Example 4 | 99.3 | −28.0 | 1.55 | 16.6 | 8.0 | 1.5 | 36 | 11.1 | 0.13 | 0.510 | 40 |
| Example 5 | 98.6 | −37.0 | 2.05 | 12.6 | 31.0 | 1.8 | 29 | 9.4 | 0.20 | 0.298 | 43 |
| Example 6 | 99.0 | −24.0 | 1.02 | 19.9 | 48.0 | 5.1 | 62 | 11.6 | 0.12 | 0.520 | 32 |
| Example 7 | 99.4 | −27.0 | 1.11 | 19.8 | 32.2 | 2.9 | 57 | 14.2 | 0.12 | 0.533 | 39 |
| Example 8 | 98.5 | −31.5 | 1.35 | 18.2 | 31.6 | 3.1 | 42 | 12.3 | 0.23 | 0.361 | 37 |
| Example 9 | 85.0 | −35.0 | 1.82 | 15.7 | 15.0 | 0.9 | 37 | 9.7 | 0.19 | 0.398 | 40 |
| Example 10 | 91.2 | −4.0 | 1.05 | 19.8 | 36.0 | 3.5 | 61 | 9.9 | 0.11 | 0.505 | 44 |
| Comparative Example 1 | 99.2 | −28.0 | 0.91 | 19.7 | 51.0 | 6.0 | 68 | 12.2 | 0.1 | 0.580 | 30 |

TABLE 1-continued

|  | | | | | | | | | | | |
|---|---|---|---|---|---|---|---|---|---|---|---|
| Comparative Example 2 | 99.5 | −25.5 | 2.25 | 10.1 | 55.0 | 7.3 | 13 | 11.7 | Not detected | 0.275 | Not detected |
| Comparative Example 3 | 99.0 | −27.0 | 1.10 | 21.5 | 19.0 | 1.7 | 66 | 12.3 | 0.1 | 0.620 | 35 |
| Comparative Example 4 | 98.3 | −28.0 | 0.65 | 19.9 | 82.0 | 11.2 | 67 | 12.7 | 0.27 | 0.310 | 36 |
| Comparative Example 5 | 99.2 | −27.0 | 1.67 | 17.8 | Not detected | 0.0 | 43 | 10.1 | 0.11 | 0.543 | 27 |
| Comparative Example 6 | 99.1 | −27.0 | 2.10 | 14.2 | Not detected | 0.0 | 31 | 9.2 | Not detected | 0.298 | Not detected |
| Comparative Example 7 | 70.0 | −41.0 | 1.89 | 16.3 | Not detected | 0.0 | 28 | 9.5 | 0.3 | 0.375 | 40 |
| Comparative Example 8 | 99.4 | −49.0 | 1.05 | 18.7 | 43.0 | 3.5 | 61 | 9.2 | 0.21 | 0.484 | 37 |
| Comparative Example 9 | 99.9 | 1.0 | 1.71 | 13.2 | 39.0 | 3.3 | 58 | 12.3 | 0.35 | 0.710 | 42 |
| Comparative Example 10 | 98.5 | −24.0 | 0.95 | 20.5 | 10.3 | 2.4 | 35 | 15.8 | 0.26 | 0.380 | 37 |
| Comparative Example 11 | 97.5 | −30.0 | 0.57 | 23.5 | 12.3 | 5.0 | 64 | 17.3 | 0.28 | 0.610 | 30 |

*B/S random (Hydrogenated Block Copolymer (b))

<Preparation of Hydrogenated Block Copolymer (b)>

A hydrogenated block copolymer (b) was produced by the same operation as in (a-1) except that: 1 L of cyclohexane was charged into the reactor, which was controlled to 60° C.; 0.07 parts by mass of Bu—Li, 1.8 mol of TMEDA, and 0.05 mol of NaOAm were used; in step 1, a cyclohexane solution containing 4.5 parts by mass of butadiene was charged into the reactor over 6 minutes, followed by reaction for 10 minutes, and the polymerization temperature was controlled to 60° C.; in step 2, a cyclohexane solution containing 8.3 parts by mass of styrene was charged into the reactor over 10 minutes, followed by reaction for 10 minutes, and the polymerization temperature was controlled to 60° C.; in step 3, a cyclohexane solution containing 80.5 parts by mass of butadiene was charged into the reactor over 70 minutes, followed by reaction for 10 minutes, and the polymerization temperature was controlled to 60° C.; and in step 4, a cyclohexane solution containing 6.7 parts by mass of styrene was charged into the reactor over 10 minutes, followed by reaction for 10 minutes, and the polymerization temperature was controlled to 60° C. to produce a block copolymer.

The obtained hydrogenated block copolymer (b) had a styrene content of 15% by mass, a weight average molecular weight of 167,000, a degree of hydrogenation of 98%, and MFR of 7.0 g/10 minutes. The results of analyzing the obtained hydrogenated block copolymer (b) are shown in Table 2.

(Hydrogenated Block Copolymer (c))

<Preparation of Hydrogenated Block Copolymer (c-1)>

A hydrogenated block copolymer (c-1) was produced by the same operation as in (a-1) except that: 1 L of cyclohexane was charged into the reactor, which was controlled to 70° C.; 0.05 parts by mass of Bu—Li and 0.4 mol of TMEDA were used, and NaOAm was not added; in step 1, a cyclohexane solution containing 5 parts by mass of styrene was charged into the reactor over 3 minutes, followed by reaction for 20 minutes, and the polymerization temperature was controlled to 70° C.; in step 2, a cyclohexane solution containing 42 parts by mass of styrene and 48 parts by mass of butadiene was charged into the reactor over 60 minutes, followed by reaction for 30 minutes, and the polymerization temperature was controlled to 70° C.; and in step 3, a cyclohexane solution containing 5 parts by mass of styrene was charged into the reactor over 3 minutes, followed by reaction for 20 minutes, and the polymerization temperature was controlled to 70° C. to produce a block copolymer.

The obtained hydrogenated block copolymer (c-1) had a total styrene content of 52% by mass, a block styrene content of 10.0% by mass, a weight average molecular weight of 163,000, a degree of hydrogenation of 98%, and MFR of 4.5 g/10 minutes. The results of analyzing the obtained hydrogenated block copolymer (c-1) are shown in Table 2.

<Preparation of Hydrogenated Block Copolymer (c-2)>

A hydrogenated block copolymer (c-2) was produced by the same operation as in (a-1) except that: 1 L of cyclohexane was charged into the reactor, which was controlled to 70° C.; 0.085 parts by mass of Bu—Li and 0.7 mol of TMEDA were used, and NaOAm was not added; in step 1, a cyclohexane solution containing 10 parts by mass of styrene was charged into the reactor over 3 minutes, followed by reaction for 20 minutes, and the polymerization temperature was controlled to 70° C.; in step 2, a cyclohexane solution containing 57 parts by mass of styrene and 33 parts by mass of butadiene was charged into the reactor over 60 minutes, followed by reaction for 30 minutes, and the polymerization temperature was controlled to 70° C.; at this point in time, the polymer solution was sampled, and the weight average molecular weight was 95,000; and then, ethyl benzoate was added thereto at 0.5 mol based on 1 mol of the lithium content in n-butyl lithium and reacted for 10 minutes for coupling reaction, and the reaction temperature was controlled to 70° C. to produce a block copolymer.

The obtained hydrogenated block copolymer (c-2) had a total styrene content of 67% by mass, a block styrene content of 20.0% by mass, a weight average molecular weight of 190,000, a degree of coupling of 53%, a degree of hydrogenation of 98%, and MFR of 6.0 g/10 minutes. The results of analyzing the obtained hydrogenated block copolymer (c-2) are shown in Table 2.

TABLE 2

| | Structure | Compositional analysis (% by mass) | | | Vinyl bond content before hydrogenation (mol %) | Degree of hydrogenation (mol %) |
| | | Styrene block content | Total styrene content | Total butadiene content | | |
|---|---|---|---|---|---|---|
| Production Example 1 | b | B-S-B-S | 15 | 15 | 85 | 75 | 98.0 |
| Production Example 2 | c-1 | S-B/S-S | 10 | 52 | 48 | 26 | 98.0 |
| Production Example 3 | c-2 | B-S-B-S | 20 | 67 | 33 | 29 | 98.0 |

Evaluation of Single Hydrogenated Block Copolymer

Examples 1 to 10 and Comparative Examples 1 to 11

The blocking, hysteresis loss, and solvent resistance of the hydrogenated block copolymers (a-1) to (a-21) of Examples 1 to 10 and Comparative Examples 1 to 11 were measured. Specifically, each physical property was evaluated on a scale of 1 to 5, and the balance among the physical properties was evaluated on the basis of the total score. A reference had a total score of 8 or higher and did not receive 1 as to any of the items. A hydrogenated block copolymer that satisfied the reference was evaluated as having good balance among the physical properties. The obtained evaluation results are shown in Table 3.

TABLE 3

| | | Structure | Blocking resistance | Hysteresis loss | Solvent resistance | Total |
|---|---|---|---|---|---|---|
| Example 1 | a-1 | C-B-S | 4 | 5 | 4 | 13 |
| Example 2 | a-2 | C-B-S-B1 | 3 | 4 | 4 | 11 |
| Example 3 | a-3 | C-B-S | 5 | 3 | 5 | 13 |
| Example 4 | a-4 | C-B-S | 3 | 3 | 2 | 8 |
| Example 6 | a-5 | C-B-S | 2 | 4 | 3 | 9 |
| Example 7 | a-6 | C-B-S | 5 | 2 | 5 | 12 |
| Example 5 | a-18 | C-B-S | 5 | 3 | 3 | 11 |
| Example 8 | a-19 | C-B-S | 3 | 3 | 4 | 10 |
| Example 9 | a-20 | C-B-S | 3 | 4 | 2 | 9 |
| Example 10 | a-21 | C-B-S | 5 | 3 | 3 | 11 |
| Comparative Example 1 | a-7 | C-B-S | 5 | 1 | 5 | 11 |
| Comparative Example 2 | a-8 | C-B | 1 | 1 | 5 | 7 |
| Comparative Example 3 | a-9 | C-B-S | 4 | 1 | 4 | 9 |
| Comparative Example 4 | a-10 | C-B-S | 2 | 1 | 5 | 8 |
| Comparative Example 5 | a-11 | S-B-S | 5 | 4 | 1 | 10 |
| Comparative Example 6 | a-12 | C-B-S | 1 | 2 | 2 | 5 |
| Comparative Example 7 | a-13 | C-B-S | 1 | 2 | 2 | 5 |
| Comparative Example 8 | a-14 | C-B-S | 5 | 1 | 4 | 10 |
| Comparative Example 9 | a-15 | C-B/S-S | 2 | 1 | 3 | 6 |
| Comparative Example 10 | a-16 | C-B-S | 2 | 2 | 3 | 7 |
| Comparative Example 11 | a-17 | C-B-S | 5 | 1 | 4 | 10 |

<Polypropylene Resin>

The following polypropylene resins were used in Examples and Comparative Examples.
(d-1): "PC630A" manufactured by SunAllomer Ltd. (propylene-ethylene random copolymer, MFR=7 g/10 minutes)
(d-2): "PM931M" manufactured by SunAllomer Ltd. (propylene-ethylene random copolymer, MFR=25 g/10 minutes)
(d-3): "PL500A" manufactured by SunAllomer Ltd. (homo propylene polymer, MFR=3 g/10 minutes)

Production Example 1 of Sheet-Shaped Molding

Examples 11 to 24 and Comparative Examples 12 to 22

Each of the hydrogenated block copolymers (a-1) to (a-21) of Examples 1 to 10 and Comparative Examples 1 to 11 was dry-blended with the polypropylene resin at the blending ratio shown in Table 4, and the blend was melt-kneaded under conditions involving 200° C., 150 rpm, and an extrusion output of 5 Kg/h using a twin-screw extruder (L/D=42, 30 mmϕ) to produce pellets of the propylene resin composition. The sheet-shaped moldings of Examples 11 to 24 and Comparative Examples 12 to 22 were prepared as described below using these pellets, and each physical property was measured. Specifically, each physical property was evaluated on a scale of 1 to 5, and the balance among the physical properties was evaluated on the basis of the total score. A reference had a total score of 16 or higher and did not receive 1 as to any of the items. A sheet-shaped molding that satisfied the reference was evaluated as having good balance among the physical properties. The obtained evaluation results are shown in Table 4.

(Production of Sheet-Shaped Molding)

The propylene resin composition pellets were applied to a T-die under conditions involving a resin temperature of 190° C., the number of screw revolutions of 30 rpm, a T-die slit thickness of 0.4 mm, a T-die slit width of 400 mm, a roller surface temperature of 35° C., and a take-up rate of 1.5 m/min to prepare sheet-shaped moldings having a thickness of approximately 200 μm. The thickness was adjusted by changing the number of screw revolutions.

TABLE 4

|  |  |  | Example | | | | | | | | | | | | | |
|---|---|---|---|---|---|---|---|---|---|---|---|---|---|---|---|---|
|  |  |  | 11 | 12 | 13 | 14 | 15 | 16 | 17 | 18 | 19 | 20 | 21 | 22 | 23 | 24 |
| Material composition (part by mass) | Hydrogenated block copolymer (a) | Type | a-1 | a-1 | a-2 | a-2 | a-3 | a-4 | a-5 | a-5 | a-6 | a-6 | a-18 | a-19 | a-20 | a-21 |
|  |  | Blending ratio | 30 | 25 | 30 | 25 | 30 | 30 | 20 | 30 | 35 | 30 | 30 | 30 | 30 | 30 |
|  | Polypropylene resin (d-1) | Blending ratio | 70 | 75 | 70 | 75 | 70 | 70 | 80 | 70 | 65 | 70 | 70 | 70 | 70 | 70 |
| Performance evaluation | Sheet-shaped molding | Transparency | 5 | 5 | 5 | 5 | 4 | 3 | 5 | 5 | 3 | 2 | 2 | 4 | 4 | 3 |
|  |  | Flexibility | 5 | 4 | 5 | 4 | 4 | 4 | 4 | 5 | 3 | 2 | 3 | 5 | 4 | 3 |
|  |  | Workability | 4 | 4 | 5 | 5 | 3 | 3 | 5 | 4 | 2 | 3 | 3 | 4 | 3 | 4 |
|  |  | Low stickiness | 4 | 5 | 3 | 4 | 5 | 4 | 3 | 2 | 4 | 5 | 5 | 2 | 3 | 5 |
|  |  | Surface smoothness | 5 | 5 | 5 | 5 | 5 | 4 | 4 | 4 | 4 | 4 | 4 | 4 | 4 | 5 |
|  |  | Total score (performance balance) | 23 | 23 | 23 | 23 | 21 | 18 | 21 | 20 | 16 | 16 | 17 | 19 | 18 | 20 |

|  |  |  | Comparative Example | | | | | | | | | | |
|---|---|---|---|---|---|---|---|---|---|---|---|---|---|
|  |  |  | 12 | 13 | 14 | 15 | 16 | 17 | 18 | 19 | 20 | 21 | 22 |
| Material composition (part by mass) | Hydrogenated block copolymer (a) | Type | a-7 | a-8 | a-9 | a-10 | a-11 | a-12 | a-13 | a-14 | a-15 | a-16 | a-17 |
|  |  | Blending ratio | 30 | 30 | 30 | 30 | 30 | 30 | 30 | 30 | 30 | 30 | 30 |
|  | Polypropylene resin (d-1) | Blending ratio | 70 | 70 | 70 | 70 | 70 | 70 | 70 | 70 | 70 | 70 | 70 |
| Performance evaluation | Sheet-shaped molding | Transparency | 1 | Not moldable | 1 | 2 | 2 | 4 | 3 | 1 | 1 | 3 | 1 |
|  |  | Flexibility | 1 |  | 1 | 1 | 2 | 5 | 3 | 1 | 3 | 4 | 1 |
|  |  | Workability | 1 |  | 2 | 2 | 2 | 3 | 2 | 2 | 2 | 4 | 1 |
|  |  | Low stickiness | 5 |  | 4 | 5 | 5 | 1 | 2 | 5 | 2 | 1 | 3 |
|  |  | Surface smoothness | 4 |  | 2 | 4 | 3 | 2 | 3 | 4 | 3 | 3 | 4 |
|  |  | Total score (performance balance) | 12 | 0 | 10 | 14 | 14 | 15 | 13 | 13 | 11 | 15 | 10 |

Production Example 2 of Sheet-Shaped Molding

Examples 25 to 38 and Comparative Examples 23 to 38

Each of the hydrogenated block copolymers (a-1) to (a-21) of Examples 1 to 10 and Comparative Examples 1 to 11 was dry-blended with the polypropylene resin at the blending ratio shown in Table 5, and the blend was melt-kneaded under conditions involving 200° C., 150 rpm, and an extrusion output of 5 Kg/h using a twin-screw extruder (L/D=42, 30 mmφ) to produce pellets of the propylene resin composition. The sheet-shaped moldings of Examples 25 to 38 and Comparative Examples 23 to 38 were prepared as described below using these pellets, and each physical property was measured. Specifically, each physical property was evaluated on a scale of 1 to 5, and the balance among the physical properties was evaluated on the basis of the total score. A reference had a total score of 16 or higher and did not receive 1 as to any of the items. A sheet-shaped molding that satisfied the reference was evaluated as having good balance among the physical properties. The obtained evaluation results are shown in Table 5.

(Production of Sheet-Shaped Molding)

The propylene resin composition pellets were applied to a T-die under conditions involving a resin temperature of 190° C., the number of screw revolutions of 30 rpm, a T-die slit width of 400 mm, and the varying T-die slit thicknesses, roller surface temperatures, and take-up rates shown in Table 5 to prepare sheet-shaped moldings having a thickness of approximately 250 μm. The thickness was adjusted by changing the number of screw revolutions and the discharge volume.

TABLE 5

| | | | Example | | | | | | | | | | |
|---|---|---|---|---|---|---|---|---|---|---|---|---|---|
| | | | 25 | 26 | 27 | 28 | 29 | 30 | 31 | 32 | 33 | 34 | 35 |
| Material composition (part by mass) | Polypropylene resin | (d-1) | 70 | 70 | 70 | 70 | 70 | 70 | 70 | 70 | 70 | 70 | 70 |
| | | (d-2) | | | | | | | | | | | |
| | | (d-3) | | | | | | | | | | | 30 |
| | Hydrogenated block copolymer | a-1 | 30 | | | | | | | | | | |
| | | a-2 | | 30 | | | | | | | | | |
| | | a-3 | | | 30 | | | | | | | | |
| | | a-4 | | | | 30 | | | | | | | |
| | | a-5 | | | | | 30 | | | | | | |
| | | a-6 | | | | | | 30 | | | | | |
| | | a-18 | | | | | | | 30 | | | | |
| | | a-19 | | | | | | | | 30 | | | |
| | | a-20 | | | | | | | | | 30 | | |
| | | a-21 | | | | | | | | | | 30 | |
| | | a-7 | | | | | | | | | | | |
| | | a-8 | | | | | | | | | | | |
| | | a-9 | | | | | | | | | | | |
| | | a-10 | | | | | | | | | | | |
| | | a-11 | | | | | | | | | | | |
| | | a-12 | | | | | | | | | | | |
| | | a-13 | | | | | | | | | | | |
| | | a-14 | | | | | | | | | | | |
| | | a-15 | | | | | | | | | | | |
| | | a-16 | | | | | | | | | | | |
| | | a-17 | | | | | | | | | | | |
| Processing condition | T-die lip opening (mm) | | 0.5 | 0.5 | 0.5 | 0.5 | 0.5 | 0.5 | 0.5 | 0.5 | 0.5 | 0.5 | 0.5 |
| | Roll take-up temperature (° C.) | | 30 | 30 | 30 | 30 | 30 | 30 | 30 | 30 | 30 | 30 | 30 |
| | Take-up rate (m/min) | | 1.4 | 1.4 | 1.4 | 1.4 | 1.4 | 1.4 | 1.4 | 1.4 | 1.4 | 1.4 | 1.4 |
| Analysis results | Intensity ratio (I14/I15) | | 0.81 | 0.83 | 1.32 | 1.21 | 0.49 | 1.38 | 1.32 | 1.03 | 0.81 | 0.81 | 0.94 |
| | Dispersity | | 0.30 | 0.37 | 0.36 | 0.37 | 0.29 | 0.40 | 0.36 | 0.41 | 0.30 | 0.30 | 0.38 |
| | CFC analysis component at −20° C. or lower (% by mass) | | 6.1 | 6.7 | 4.9 | 8.1 | 7.7 | 4.5 | 4.9 | 6.5 | 6.1 | 6.1 | 6.8 |
| | CFC analysis component at higher than −20° C. and lower than 60° C. (% by mass) | | 28.9 | 26.9 | 29.0 | 25.7 | 26.6 | 28.7 | 29.0 | 28.3 | 28.9 | 28.9 | 28.1 |
| | CFC analysis component at 60° C. or higher and 150° C. or lower (% by mass) | | 65.0 | 66.4 | 66.1 | 66.2 | 65.7 | 66.8 | 66.1 | 65.2 | 65.0 | 65.0 | 65.1 |
| | CFC analysis component at 10° C. or higher and lower than 60° C. (Mw/Mn) | | 1.32 | 1.29 | 1.36 | 1.38 | 1.28 | 1.39 | 1.36 | 1.42 | 1.32 | 1.32 | 1.31 |

TABLE 5-continued

| | | | Example | | | Comparative Example | | | | | | |
|---|---|---|---|---|---|---|---|---|---|---|---|---|
| | | | 36 | 37 | 38 | 23 | 24 | 25 | 26 | 27 | 28 | 29 |
| Performance evaluation | Sheet-shaped molding | Transparency | 5 | 4 | 4 | 5 | 2 | 2 | 4 | 4 | 3 | 4 |
| | | Flexibility | 5 | 4 | 4 | 5 | 2 | 3 | 5 | 4 | 3 | 4 |
| | | Anisotropy | 5 | 4 | 4 | 5 | 3 | 3 | 4 | 3 | 4 | 4 |
| | | Low stickiness | 4 | 5 | 4 | 2 | 5 | 5 | 2 | 3 | 5 | 5 |
| | | Surface smoothness | 5 | 5 | 5 | 4 | 5 | 4 | 4 | 4 | 5 | 4 |
| | | Total score (performance balance) | 24 | 22 | 21 | 21 | 17 | 17 | 19 | 18 | 20 | 21 |
| Material composition (part by mass) | Polypropylene resin | (d-1) | | 25 | 85 | 70 | 70 | 70 | 70 | 70 | 70 | 70 |
| | | (d-2) | 60 | | | | | | | | | |
| | | (d-3) | 40 | 75 | 15 | | | | | | | |
| | Hydrogenated block copolymer | a-1 | | | | | | | | | | |
| | | a-2 | | | | | | | | | | |
| | | a-3 | | | | | | | | | | |
| | | a-4 | | | | | | | | | | |
| | | a-5 | | | | | | | | | | |
| | | a-6 | | | | | | | | | | |
| | | a-18 | | | | | | | | | | |
| | | a-19 | | | | | | | | | | |
| | | a-20 | | | | | | | | | | |
| | | a-21 | | | | | | | | | | |
| | | a-7 | | | | 30 | | | | | | |
| | | a-8 | | | | | 30 | | | | | |
| | | a-9 | | | | | | 30 | | | | |
| | | a-10 | | | | | | | 30 | | | |
| | | a-11 | | | | | | | | 30 | | |
| | | a-12 | | | | | | | | | | |
| | | a-13 | | | | | | | | | 30 | |
| | | a-14 | | | | | | | | | | 30 |
| | | a-15 | | | | | | | | | | |
| | | a-16 | | | | | | | | | | |
| | | a-17 | | | | | | | | | | |
| Processing condition | T-die lip opening (mm) | | 0.5 | 0.5 | 0.5 | 0.5 | 0.5 | 0.5 | 0.5 | 0.5 | 0.5 | 0.5 |
| | Roll take-up temperature (° C.) | | 30 | 30 | 30 | 30 | 30 | 30 | 30 | 30 | 30 | 30 |
| | Take-up rate (m/min) | | 1.4 | 1.4 | 1.4 | 1.4 | 1.4 | 1.4 | 1.4 | 1.4 | 1.4 | 1.4 |
| Analysis results | Intensity ratio (I14/I15) | | 1.35 | 0.67 | 1.19 | 1.78 | Not moldable | 1.93 | 1.46 | 2.2 | 0.94 | 1.27 |
| | Dispersity | | 0.49 | 0.36 | 0.34 | 0.61 | | 0.65 | 0.25 | 0.63 | 0.39 | 0.62 |
| | CFC analysis component at −20° C. or lower (% by mass) | | 7.2 | 6.9 | 6.4 | 5.4 | | 7.8 | 3.3 | 27.8 | 25.2 | 24.9 |
| | CFC analysis component at higher than −20° C. and lower than 60° C. (% by mass) | | 25.7 | 26.5 | 27.6 | 28.7 | | 26.9 | 29.8 | 6.4 | 9.3 | 8.5 |
| | CFC analysis component at 60° C. or higher and 150° C. or lower (% by mass) | | 67.1 | 66.6 | 66.0 | 65.9 | | 65.3 | 66.9 | 65.8 | 65.5 | 66.6 |
| | CFC analysis component at 10° C. or higher and lower than 60° C. (Mw/Mn) | | 1.33 | 1.32 | 1.41 | 1.39 | | 1.37 | 1.35 | 3.64 | 2.97 | 3.42 |

TABLE 5-continued

| Performance evaluation | Sheet-shaped molding | | 30 | 31 | 32 | 33 | 34 | 35 | 36 | 37 | 38 |
|---|---|---|---|---|---|---|---|---|---|---|---|
| | | | | | | | Comparative Example | | | | |
| | Transparency | | 3 | 4 | 1 | | 1 | 2 | 2 | 4 | 3 |
| | Flexibility | | 3 | 3 | 1 | | 1 | 2 | 2 | 5 | 4 |
| | Anisotropy | | 3 | 3 | 1 | | 1 | 1 | 2 | 3 | 2 |
| | Low stickiness | | 5 | 5 | 5 | | 5 | 5 | 4 | 1 | 2 |
| | Surface smoothness | | 5 | 5 | 4 | | 2 | 4 | 4 | 3 | 3 |
| | Total score (performance balance) | | 19 | 20 | 12 | 0 | 10 | 14 | 14 | 16 | 14 |
| Material composition (part by mass) | Polypropylene resin | (d-1) | 70 | 70 | 70 | 70 | 5 | 95 | 70 | 70 | 70 |
| | | (d-2) | | | | | | | | | |
| | | (d-3) | | | | | | | | | |
| | Hydrogenated block copolymer | a-1 | | | | | | | | | |
| | | a-2 | | | | | | | | | |
| | | a-3 | | | | | | | | | |
| | | a-4 | | | | | | | | | |
| | | a-5 | | | | | | | | | |
| | | a-6 | | | | | | | | | |
| | | a-18 | | | | | | | | | |
| | | a-19 | | | | | | | | | |
| | | a-20 | | | | | | | | | |
| | | a-21 | | | | | | | | | |
| | | a-7 | | | | | | | | | |
| | | a-8 | | | | | | | | | |
| | | a-9 | | | | | | | | | |
| | | a-10 | | | | | | | | | |
| | | a-11 | | | | | | | | | |
| | | a-12 | | | | | | | | | |
| | | a-13 | | | | | | | | | |
| | | a-14 | 30 | | | | | | | | |
| | | a-15 | | 30 | | | | | | | |
| | | a-16 | | | 30 | | | | | | |
| | | a-17 | | | | 30 | 95 | 5 | 30 | 30 | 30 |

TABLE 5-continued

| | | | | | | | | | | |
|---|---|---|---|---|---|---|---|---|---|---|
| Processing condition | T-die lip opening (mm) | 0.5 | 0.5 | 0.5 | 0.5 | 0.5 | 0.5 | 1.5 | 0.5 | 1.5 |
| | Roll take-up temperature (° C.) | 30 | 30 | 30 | 30 | 30 | 30 | 90 | 90 | 45 |
| | Take-up rate (m/min) | 1.4 | 1.4 | 1.4 | 1.4 | 1.4 | 1.4 | 1.4 | 12 | 12 |
| Analysis results | Intensity ratio (I14/I15) | 1.01 | 1.51 | 1.09 | 1.84 | 0.07 | 1.37 | 2.09 | 1.77 | 1.96 |
| | Dispersity | 1.21 | 0.66 | 0.45 | 0.65 | 0.38 | 0.25 | 0.84 | 0.77 | 0.91 |
| | CFC analysis component at −20° C. or lower (% by mass) | 4.5 | 7 | 6.5 | 4.4 | 6 | 6.1 | 5.9 | 6.3 | 6.1 |
| | CFC analysis component at higher than −20° C. and lower than 60° C. (% by mass) | 29.3 | 26.8 | 28.1 | 29.9 | 89.6 | 3.8 | 29.6 | 29.0 | 28.7 |
| | CFC analysis component at 60° C. or higher and 150° C. or lower (% by mass) | 66.2 | 66.2 | 65.4 | 65.7 | 4.4 | 90.1 | 64.5 | 64.7 | 65.2 |
| | CFC analysis component at 10° C. or higher and lower than 60° C. (Mw/Mn) | 1.27 | 1.43 | 1.52 | 1.58 | 1.31 | 1.48 | 1.32 | 1.32 | 1.32 |
| Performance evaluation | Sheet-shaped molding — Transparency | 1 | 1 | 3 | 1 | 5 | 1 | 3 | 3 | 3 |
| | Flexibility | 1 | 2 | 4 | 1 | 5 | 1 | 2 | 2 | 2 |
| | Anisotropy | 1 | 2 | 4 | 1 | 5 | 1 | 2 | 3 | 3 |
| | Low stickiness | 5 | 2 | 1 | 4 | 1 | 5 | 4 | 4 | 4 |
| | Surface smoothness | 5 | 3 | 3 | 4 | 1 | 5 | 1 | 1 | 2 |
| | Total score (performance balance) | 13 | 10 | 15 | 11 | 17 | 13 | 12 | 13 | 15 |

Production Example of Surface Protecting Film

Examples 39 to 61 and Comparative Examples 39 to 53

Polyethylene (HDPE, manufactured by Asahi Kasei Chemicals Corp., trade name "CREOLEX T5070L", MFR (190° C., 2.16 kg load)=7.0 g/10 minutes) forming a substrate layer, and the hydrogenated block copolymers (a-1) to (a-21), (b), (c-1), and (c-2) and tackifiers-1 to -4 forming a tacky layer were blended at the ratios shown in Tables 6 and 7. The respective blends of both the layers were supplied to an extruder and integrally coextruded by the T-die coextrusion method to produce surface protecting films having a substrate layer thickness of 40 μm and a tacky layer thickness of 10 μm.

In order to evaluate the performance of the surface protecting films obtained in Examples 39 to 61 and Comparative Examples 39 to 53, initial tack strength, tack increasing properties, and followability to irregularities were measured and evaluated.

These results are shown in Tables 6 and 7.

TABLE 6

| | | Example 39 | Example 40 | Example 41 | Example 42 | Example 43 | Example 44 | Example 45 | Example 46 | Example 47 | Example 48 | Comparative Example 39 |
|---|---|---|---|---|---|---|---|---|---|---|---|---|
| Blend of tacky layer | Hydrogenated block copolymer | a-1 | a-2 | a-3 | a-4 | a-5 | a-6 | a-18 | a-19 | a-20 | a-21 | a-7 |
| | Blending ratio of tacky layer (% by mass) | 100 | 100 | 100 | 100 | 100 | 100 | 100 | 100 | 100 | 100 | 100 |
| Physical property | Initial tack strength | ○ | ○ | Δ | ○ | ○ | Δ | Δ | ○ | ○ | Δ | x |
| | Tack increasing property | ○ | ○ | ○ | Δ | Δ | ○ | ○ | Δ | Δ | ○ | ○ |
| | Followability to irregularities | ○ | ○ | Δ | ○ | ○ | Δ | Δ | ○ | ○ | Δ | x |

| | | Comparative Example 40 | Comparative Example 41 | Comparative Example 42 | Comparative Example 43 | Comparative Example 44 | Comparative Example 45 | Comparative Example 46 | Comparative Example 47 | Comparative Example 48 | Comparative Example 49 |
|---|---|---|---|---|---|---|---|---|---|---|---|
| Blend of tacky layer | Hydrogenated block copolymer | a-8 | a-9 | a-10 | a-11 | a-12 | a-13 | a-14 | a-15 | a-16 | a-17 |
| | Blending ratio of tacky layer (% by mass) | 100 | 100 | 100 | 100 | 100 | 100 | 100 | 100 | 100 | 100 |
| Physical property | Initial tack strength | Δ | x | x | ○ | ○ | ○ | x | x | ○ | x |
| | Tack increasing property | x | Δ | Δ | x | x | x | Δ | ○ | x | Δ |
| | Followability to irregularities | ○ | x | x | Δ | ○ | Δ | x | Δ | Δ | x |

Substrate layer of film: HDPE (CREOLEX T5070L manufactured by Asahi Kasei Chemicals Corp.)
Thickness of substrate layer = 40 μm, thickness of tacky layer = 10 μm

TABLE 7

| | | Example 49 | Example 50 | Example 51 | Example 52 | Example 53 | Example 54 | Example 55 | Example 56 | Example 57 |
|---|---|---|---|---|---|---|---|---|---|---|
| Blending ratio of tacky layer (% by mass) | a-1 | 90 | 70 | 10 | 70 | 70 | 95 | 90 | 70 | 90 |
| | a-18 | | | | | | | | | |
| | a-7 | | | | | | | | | |
| | a-16 | | | | | | | | | |
| | b | 10 | 30 | 90 | | | | | | |
| | c-1 | | | | 30 | | | | | |
| | c-2 | | | | | 30 | | | | |
| | Tackifier-1 | | | | | | 5 | 10 | 30 | |
| | Tackifier-2 | | | | | | | | | 10 |
| | Tackifier-3 | | | | | | | | | |
| | Tackifier-4 | | | | | | | | | |
| | SEBS-1 | | | | | | | | | |

TABLE 7-continued

| | | Example 58 | Example 59 | Example 60 | Example 61 | Comparative Example 50 | Comparative Example 51 | Comparative Example 52 | Comparative Example 53 |
|---|---|---|---|---|---|---|---|---|---|
| Physical property | Initial tack strength | ○ | ○ | ○ | Δ | ○ | ○ | ○ | ○ |
| | Tack increasing property | ○ | ○ | Δ | ○ | Δ | ○ | ○ | Δ |
| | Followability to irregularities | ○ | ○ | Δ | Δ | ○ | ○ | ○ | ○ |

| | | Example 58 | Example 59 | Example 60 | Example 61 | Comparative Example 50 | Comparative Example 51 | Comparative Example 52 | Comparative Example 53 |
|---|---|---|---|---|---|---|---|---|---|
| Blending ratio of tacky layer (% by mass) | a-1 | 90 | 90 | | | | | | |
| | a-18 | | 70 | 70 | | | | | |
| | a-7 | | | | | 70 | 70 | 30 | |
| | a-16 | | | | | | | | 70 |
| | b | | | 30 | | 30 | | | |
| | c-1 | | | | 30 | | 30 | | 30 |
| | c-2 | | | | | | | | |
| | Tackifier-1 | | | | | | | | |
| | Tackifier-2 | | | | | | | | |
| | Tackifier-3 | 10 | | | | | | | |
| | Tackifier-4 | | 10 | | | | | | |
| | SEBS-1 | | | | | | | 70 | |
| Physical property | Initial tack strength | ○ | ○ | Δ | Δ | x | x | x | x |
| | Tack increasing property | ○ | ○ | ○ | ○ | Δ | ○ | ○ | Δ |
| | Followability to irregularities | ○ | ○ | Δ | Δ | x | x | x | Δ |

Substrate layer of film: HDPE (CREOLEX T5070L manufactured by Asahi Kasei Chemicals Corp.)
Thickness of substrate layer = 40 μm, thickness of tacky layer = 10 μm
Tackifier-1: Kuriaron P125 (hydrogenated terpene resin/manufactured by Yasuhara Chemical Co., Ltd.)
Tackifier-2: YS POLYSTER G150 (terpene phenol resin/manufactured by Yasuhara Chemical Co., Ltd.)
Tackifier-3: Kuriaron M (aromatic modified terpene resin/manufactured by Yasuhara Chemical Co., Ltd.)
Tackifier-4: YS POLYSTER UH (hydrogenated terpene phenol resin/manufactured by Yasuhara Chemical Co., Ltd.)
SEBS-1: Tuftec H1051 (styrene content = 42%/manufactured by Asahi Kasei Corp.)

The present application claims the priority based on Japanese Patent Application No. 2015-177959 filed on Sep. 9, 2015, Japanese Patent Application No. 2015-177957 filed on Sep. 9, 2015, Japanese Patent Application No. 2015-177968 filed on Sep. 9, 2015, and Japanese Patent Application No. 2015-177956 filed on Sep. 9, 2015, the contents of which are incorporated herein by reference.

The invention claimed is:

1. A hydrogenated block copolymer comprising, in a molecule thereof, a polymer block (C) having a conjugated diene compound as a main component, a polymer block (B) having a conjugated diene compound as a main component, and a polymer block (S) having a vinyl aromatic compound as a main component, wherein:
   in the hydrogenated block copolymer, a content of the polymer block (C) is 1 to 20% by mass, a content of the polymer block (B) is 69 to 98% by mass, and a content of the polymer block (S) is 1 to 15% by mass;
   a vinyl bond content before hydrogenation of the polymer block (C) is 1 to 25 mol %, and a vinyl bond content before hydrogenation of the polymer block (B) is 60 to 100 mol %;
   a degree of hydrogenation of the hydrogenated block copolymer is 80 mol % or more;
   a tan δ peak obtained by a dynamic viscoelasticity measurement (1 Hz) of the hydrogenated block copolymer is in a range of higher than −45° C. and 10° C. or lower, a height of the tan δ peak is 1.0 or more, and a width at half height of the tan δ peak is 20° C. or lower;
   a value obtained from $V_H$–$V_L$ is 10 mol % or less; and
   when the polymer block (B) is divided into a first region to a sixth region in order from a polymerization start side, each region having an equal mass, $V_H$ and $V_L$ represent a highest value and a lowest value, respectively, of vinyl bond contents before hydrogenation of the first region to the sixth region.

2. The hydrogenated block copolymer according to claim 1, wherein
   the content of the polymer block (C) is 3 to 15% by mass, and a total content of the polymer block (C) and the polymer block (S) is 6 to 25% by mass.

3. The hydrogenated block copolymer according to claim 1, wherein the hydrogenated block copolymer comprises two or more polymer blocks (B), and
   a content of a polymer block (B-1) present at the end of the hydrogenated block copolymer based on the polymer blocks (B) is 1 to 10% by mass.

4. The hydrogenated block copolymer according to claim 1, wherein the polymer block (C) comprises butadiene, and the polymer block (B) comprises isoprene.

5. The hydrogenated block copolymer according to claim 1, wherein the content of the polymer block (S) is 3 to 10% by mass.

6. The hydrogenated block copolymer according to claim 1, wherein the tan δ peak obtained by the dynamic viscoelasticity measurement (1 Hz) of the hydrogenated block copolymer is in the range of higher than −45° C. and 10° C. or lower, the height of the tan δ peak is 1.2 or more, and the width at half height of the tan δ peak is 18° C. or lower.

7. The hydrogenated block copolymer according to claim 1, wherein a total content of a component having a weight average molecular weight twice or more a peak weight average molecular weight and a component having a weight average molecular weight 0.5 times or less the peak weight average molecular weight is 15% or less.

8. A polypropylene resin composition comprising 10 to 90% by mass of the hydrogenated block copolymer according to claim 1 and 10 to 90% by mass of a polypropylene resin, wherein
   in a wide angle X ray diffractometry of the polypropylene resin composition, an intensity ratio of diffraction peak intensity (I14) at a scattering angle (2θ) of 14° to diffraction peak intensity (I15) at a scattering angle (2θ) of 15°, I14/I15, is 0.1 or more and less than 1.4.

9. The polypropylene resin composition according to claim 8, wherein in measurement by cross fractionation chromatography, an integral elution volume at −20° C. or lower is 0.1% or more and less than 50% of a total volume, an integral elution volume in a range of higher than −20° C. and lower than 60° C. is 10% or more and less than 90% of the total volume, and an integral elution volume in a range of 60° C. or higher and 150° C. or lower is 10% or more and less than 90% of the total volume.

10. The polypropylene resin composition according to claim 8, wherein in measurement by cross fractionation chromatography, a molecular weight distribution (Mw/Mn) of an eluted component in a range of 10° C. or higher and lower than 60° C. is 1.05 or more and 1.50 or less.

11. A tube comprising the polypropylene resin composition according to claim 8.

12. A sheet-shaped molding comprising the polypropylene resin composition according to claim 8.

13. A tacky film comprising:
   a substrate film; and
   a tacky layer comprising the hydrogenated block copolymer according to claim 1, the tacky layer being disposed on the substrate film.

14. The tacky film according to claim 13, wherein the tacky layer further comprises 0.5 to 50% by mass of a tackifier.

* * * * *